(12) United States Patent
Le et al.

(10) Patent No.: US 10,891,000 B2
(45) Date of Patent: Jan. 12, 2021

(54) MASSAGE CHAIRS WITH TOUCHSCREEN-BASED CONTROL SYSTEM

(71) Applicants: Kevin Le, Richland Hills, TX (US); Tom Le, Arlington, TX (US); Varad Gokhale, Irving, TX (US)

(72) Inventors: Kevin Le, Richland Hills, TX (US); Tom Le, Arlington, TX (US); Varad Gokhale, Irving, TX (US)

(*) Notice: Subject to any disclaimer, the term of this patent is extended or adjusted under 35 U.S.C. 154(b) by 0 days.

(21) Appl. No.: 16/256,794

(22) Filed: Jan. 24, 2019

(65) Prior Publication Data
US 2020/0241683 A1 Jul. 30, 2020

(51) Int. Cl.
G06F 3/041 (2006.01)
A61H 15/00 (2006.01)
A61H 23/00 (2006.01)

(52) U.S. Cl.
CPC ....... *G06F 3/0416* (2013.01); *A61H 15/0078* (2013.01); *G06F 3/0412* (2013.01); *A61H 23/006* (2013.01); *A61H 2201/0149* (2013.01); *A61H 2201/5046* (2013.01)

(58) Field of Classification Search
CPC combination set(s) only.
See application file for complete search history.

(56) References Cited

U.S. PATENT DOCUMENTS

| | | | |
|---|---|---|---|
| 3,532,089 A | 10/1970 | Arntzenius | |
| 4,422,449 A | 12/1983 | Hamabe | |
| 4,574,786 A | 3/1986 | Hashimoto et al. | |
| 5,020,518 A | 6/1991 | Spears et al. | |
| 5,233,973 A | 8/1993 | Gill et al. | |
| 5,304,112 A | 4/1994 | Mrklas et al. | |
| 5,769,799 A | 6/1998 | Daughtry | |

(Continued)

FOREIGN PATENT DOCUMENTS

CN 101744707 B 10/2011
JP H06209 A 1/1994
(Continued)

OTHER PUBLICATIONS

"MassageChairStore.com," downloaded Sep. 12, 2013, <URL:www.massagechairstore.com/>.

(Continued)

*Primary Examiner* — Van N Chow
(74) *Attorney, Agent, or Firm* — Law Office of Jeff Williams PLLC; J. Oliver Williams

(57) ABSTRACT

The present invention is a touchscreen-based control system for massage chairs that includes a touchscreen device. In another aspect, the present invention is a massage chair controlled by a touchscreen-based control system that includes a touchscreen-based control system. In a further aspect, the present invention is a massage chair controlled by a touchscreen-based control system that includes a touchscreen-based control system having a software program allowing a user to customize a massage function and save it in a memory thereby allowing the user to open or load the saved function. In a further aspect, the present invention is a massage chair controlled by a touchscreen-based control system wherein the massage chair includes an inflatable air-cell to provide massage effects in the footrest and armrest areas of a user.

41 Claims, 28 Drawing Sheets

(56) References Cited

U.S. PATENT DOCUMENTS

| | | | |
|---|---|---|---|
| 5,792,047 A | 8/1998 | Coggins | |
| 5,993,401 A | 11/1999 | Inbe et al. | |
| 6,171,266 B1 | 1/2001 | Inada et al. | |
| 6,224,563 B1 | 5/2001 | Nonoue et al. | |
| 6,394,970 B1 | 5/2002 | Maier | |
| 6,494,850 B1 | 12/2002 | Kitadou et al. | |
| 6,511,448 B1 | 1/2003 | Furuie et al. | |
| 6,540,701 B1 | 4/2003 | Inada | |
| 6,629,939 B2 | 10/2003 | Jikiba et al. | |
| 6,656,140 B2 | 12/2003 | Oguma et al. | |
| RE38,419 E | 2/2004 | Auer | |
| 6,695,799 B2 | 2/2004 | Kitadou et al. | |
| 6,749,577 B2 | 6/2004 | Kume et al. | |
| 6,899,687 B2 | 5/2005 | Hori et al. | |
| 6,991,609 B2 | 1/2006 | Kan et al. | |
| 7,806,840 B2 | 10/2010 | Chen | |
| 7,854,710 B2 | 12/2010 | Liang | |
| 7,947,002 B2 | 5/2011 | Mizoguchi et al. | |
| 8,464,380 B2 * | 6/2013 | Bobey | A61G 7/05776 5/425 |
| 10,052,249 B2 * | 8/2018 | Elliott | A61B 5/447 |
| 10,092,480 B2 | 10/2018 | Le et al. | |
| 2002/0138023 A1 | 9/2002 | Kume et al. | |
| 2002/0193713 A1 | 12/2002 | Lee | |
| 2003/0120187 A1 | 6/2003 | Kan et al. | |
| 2004/0122343 A1 | 6/2004 | Mod et al. | |
| 2004/0158181 A1 | 7/2004 | Watanabe et al. | |
| 2005/0090769 A1 | 4/2005 | Chen | |
| 2005/0113723 A1 | 5/2005 | Ueyama | |
| 2005/0192520 A1 | 9/2005 | Morita et al. | |
| 2005/0242635 A1 | 11/2005 | Cassaday | |
| 2006/0111653 A1 | 5/2006 | Nishio et al. | |
| 2007/0239089 A1 | 10/2007 | Chiu | |
| 2007/0299377 A1 | 12/2007 | Shiraishi | |
| 2008/0009777 A1 | 1/2008 | Chiu | |
| 2008/0097260 A1 | 4/2008 | Tsukada et al. | |
| 2009/0306558 A1 | 12/2009 | Chen | |
| 2009/0306588 A1 | 12/2009 | Nguyen | |
| 2010/0030121 A1 | 2/2010 | Fu | |
| 2010/0249613 A1 | 9/2010 | Hashimoto | |
| 2011/0055720 A1 | 3/2011 | Potter | |
| 2011/0077561 A1 | 3/2011 | Choly | |
| 2012/0011438 A1 | 1/2012 | Kim | |
| 2012/0215143 A1 | 8/2012 | Inada | |
| 2013/0088059 A1 | 4/2013 | Nagamitsu | |
| 2014/0237587 A1 * | 8/2014 | Forbes | G06F 21/00 726/18 |
| 2015/0051526 A1 | 2/2015 | Wang | |
| 2017/0295443 A1 * | 10/2017 | Boesen | G06F 3/04883 |
| 2020/0085673 A1 * | 3/2020 | Seo | A61H 15/00 |

FOREIGN PATENT DOCUMENTS

| | | |
|---|---|---|
| JP | H1119150 A | 1/1999 |
| JP | 2000342644 A | 12/2000 |

OTHER PUBLICATIONS

"Osaki OS-4000 Instruction Manual," downloaded Sep. 12, 2013, <URL:www.hitechmassagechairs.com/PDF/OS-4000-Manual.pdf>.

"Luminous-spa-pedicure-chair-owner-manual," downloaded Aug. 15, 2016, <URL:www.uspedicurespa.com/resources/lexor/luminous-spa-pedicure-chair-owner-manual.pdf>.

* cited by examiner

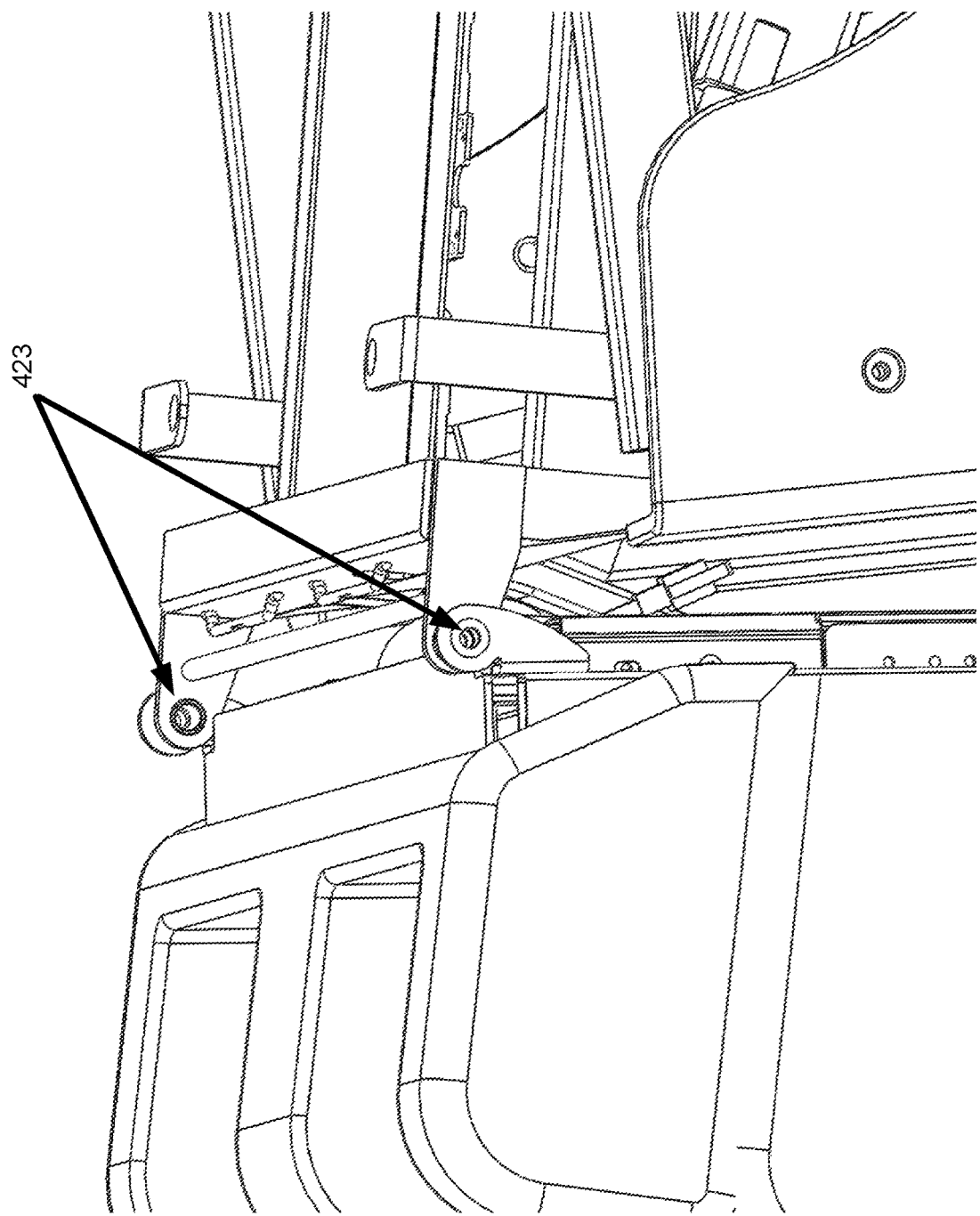

MASSAGE CHAIRS WITH TOUCHSCREEN-BASED CONTROL SYSTEM

BACKGROUND

1. Field of the Invention

The invention generally relates to massage chairs and control systems for massage chairs. More specifically, the present invention is a touchscreen-based control system for massage chairs. Also, the present invention is a massage chair controlled by a touchscreen-based control system that includes a touchscreen-based control system. Further, the present invention is a massage chair controlled by a touchscreen-based control system that includes a touchscreen-based control system and at least one health monitoring device or system.

2. Description of Related Art

Massage chairs and control systems for massage chairs are known in the art. Such chairs and systems generally operate with physical keypads to adjust settings and operate the control system used in the chairs.

One major advantage touchscreens or touchscreen devices have over other input methods is ease of use. While the usual keypad with physical buttons is familiar to most users, the practice of reaching out and touching icons on a screen comes intuitively even to those without a tech background. The biggest benefit of touchscreen technology is how easy it is to use. A user can just tap an icon to activate it, and on computers, smartphones and tablets, the user can scroll pages with just a flick of the user's finger(s).

Touchscreens provide fast access to any and all types of digital media, with no text-bound interface getting in the way. Touchscreens have the potential to be more comfortable for the user. Impaired individuals can use touchscreen technology, especially those who find using a mouse or keyboard difficult.

Touchscreen-based systems virtually eliminate errors because users select from clearly defined menus. The information on each screen is limited in number and options, thus providing step-by-step, fail-safe sequences to guide the user through complex procedures.

Touchscreens are also valuable in accommodating users with physical issues that might make a traditional remote keypad setup difficult to use.

While one might think that a touchscreen gets dirty quickly, one can actually easily clean it by simply wiping the screen. Touchscreens are generally made of glass or a similar hard-coated surface. So it's easy to clean and therefore extremely well suited for the typical environments found in restaurants, hospitals, and the food and pharmaceutical industries. Touchscreens have smooth, flat screens, which makes cleaning a much easier task. Devices which do not require a keyboard tend to collect less dust. The function of the computer mouse is eliminated as well—a device with many crevices that are difficult to clean. The wireless nature of touchscreens also eliminates the mess of tangled power cords.

The devices with physical buttons on the keypads are susceptible to damage. For instance, a keyboard or a keypad has separate keys and related circuits, any of which can break or become inoperable due to dirt, crumbs, water damage, etc. In contrast, touchscreens can be protected more easily because they do not have as many parts. This means that touchscreens have the potential to have a longer product life than standard monitors and computer systems.

By combining the data entry method with the display, the overall size of the device is reduced significantly. This advantage is most obvious when it comes to portable devices.

It is also worth noting that the existing systems of massage chairs are unable to track different users and "remember" a returning user. Typically, the massage chair and system will run a body scan of the user and try to detect where a massage is needed, the type of massage, or the general need of the user. These systems are not intuitive and are configured to perform a set operative instruction of scanning each user prior to use. The level of body scan is minimal in its complexity. Even where touch screen technology has been used with chairs that are similar with massage chairs, they maintain basic features that are disassociated with the user.

Although strides have been made to improve the operative functionality of massage chairs and associated control systems, shortcomings remain. It is desired that a touchscreen-based control system for a massage chair be developed that permits user specific controls and the ability to store user preferences for recall.

SUMMARY OF THE INVENTION

It is an object of the present application to provide a touchscreen-based control system for massage chairs. In another aspect of the present application, the present invention includes a massage chair controlled by a touchscreen-based control system. The touchscreen-based control system permits a user to store preferences and create a unique user profile. In a further aspect of the present application, the system includes a massage chair controlled by a touchscreen-based control system that includes a touchscreen-based control system at least one health monitoring device or system.

In a preferred and non-limiting embodiment of an aspect of the present invention, the touchscreen-based control system includes a touchscreen device in operative communication with a massage chair that provides massage effects to a body of a user. The touchscreen device communicates with the massage chair by sending and receiving digital information. The touchscreen device comprises a housing, a touch-sensitive layer, a display layer, a printed circuit board (PCB), a digital processor, a software program that controls the touch sensitive layer and the display layer. The software program receives signals from touch sensitive layer and sends signals to display layer in the response to touch inputs from the user, and a software program in operative communication with the massage chair. The software program allows the user to adjust the chair actuator positions, the chair settings, and select massage functions or profiles. The software program also allows the user to customize a massage function and save it in a memory and allows user to open or load the saved function when needed. The processor processes the touch inputs from user and operatively sending signals to the display layer to display a video or picture on said display layer. Additional features and functions of the device are illustrated and discussed below.

The touchscreen device preferably comprises some, most or all of the following components: a housing, a touch-sensitive layer or surface, a touch controller, a processor or operating system, a display controller, a display layer or surface, software, software program or application (app) comprising providable information that may be provided to a user in response to touch inputs from the user, and software, software program or application (app) in operative communication with the massage chair.

The touchscreen-based control system allows a user of a massage chair to gain access to providable information by selecting various selectable selections and tabs with the use of one or more fingers of the user. Selectable selections allow functionalities of the system to be at the control of the user. Such user selectable selections allow the user to select and/or modify time settings, massage settings, voice feedback, heat settings, intensity settings, and other setting preferences to name a few.

The more important features of the system have thus been outlined in order that the more detailed description that follows may be better understood and to ensure that the present contribution to the art is appreciated. Additional features of the system will be described hereinafter and will form the subject matter of the claims that follow.

Many objects of the present system will appear from the following description and appended claims, reference being made to the accompanying drawings forming a part of this specification wherein like reference characters designate corresponding parts in the several views.

Before explaining at least one embodiment of the system in detail, it is to be understood that the assembly is not limited in its application to the details of construction and the arrangements of the components set forth in the following description or illustrated in the drawings. The assembly is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the various purposes of the present system. It is important, therefore, that the claims be regarded as including such equivalent constructions insofar as they do not depart from the spirit and scope of the present system.

DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

FIG. 31 is an enlarged perspective view of a portion of the massage chair of FIG. 29.

Figure 1:
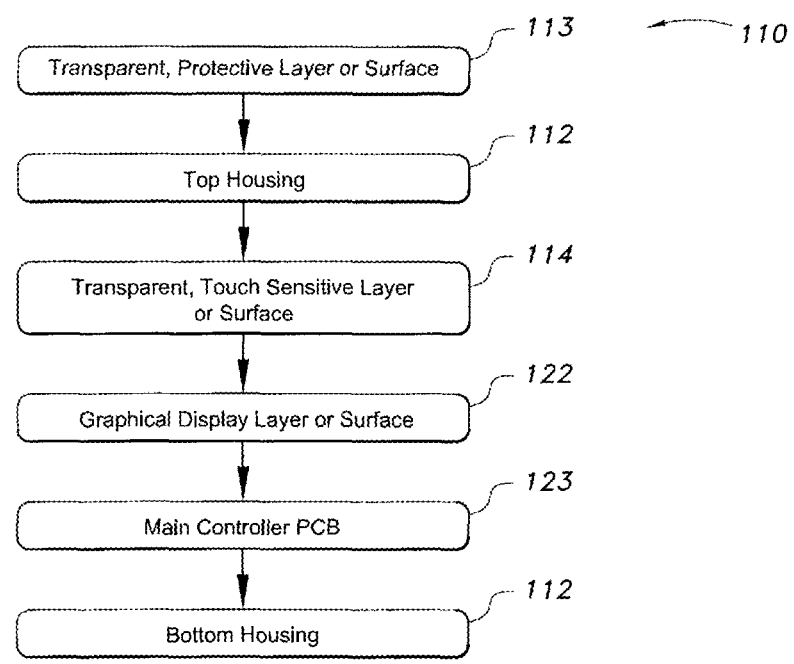
FIG. 1 is a block diagram of a non-limiting example of a hardware assembly of a touchscreen device of a touchscreen-based control system according to the present invention.

While the present application is susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the preferred embodiment are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the assembly described herein may be oriented in any desired direction.

The invention of the present application overcomes one or more of the above-discussed problems commonly associated with massage chairs and control systems discussed previously. In particular, the touchscreen-based control system for a massage chair provides a user with the ability to store a profile that includes a set of preferences, progress, and other settings necessary or desired by the user for treatment and care. The system stores internally a set of data for instant recall by any user with a profile. The system permits a single chair to be used for multiple users while maintaining specifically tailored treatment for each user. These and other unique features of the system are discussed below and illustrated in the accompanying drawings.

The system and method will be understood, both as to its structure and operation, from the accompanying drawings, taken in conjunction with the accompanying description. Several embodiments of the assembly may be presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless otherwise described.

Referring now to the Figures wherein like reference characters identify corresponding or similar elements in form and function throughout the several views. The following Figures describe the assembly of the present application and its associated features. With reference now to the Figures, an embodiment of the modular observation assembly and method of use are herein described. It should be noted that the articles "a", "an", and "the", as used in this specification, include plural referents unless the content clearly dictates otherwise.

Referring to FIGS. 1-10, the present application describes a touchscreen-based control system 100 for massage chairs. Referring to FIGS. 11-19 and in another aspect of the present application, the present application describes a massage chair 200 controlled by a touchscreen-based control system that includes a touchscreen-based control system. Referring to FIG. 20 and in a further aspect of the present application, the present application describes a massage chair 2000 controlled by a touchscreen-based control system that includes a touchscreen-based control system and at least one health monitoring device or system 2100. Referring to FIGS. 21-31 and in another aspect of the present application, the present application describes an alternate embodiment of a massage chair with a touchscreen device 300 is shown.

The touchscreen-based control system 100 allows a user of a massage chair to gain access to providable information by selecting various selectable selections and tabs, such as, but not limited to, the modes of massages; massage intensity settings, chair position settings, chair heat settings and any combination(s) thereof; the Internet; songs; radio stations; etc., with the use of one or more fingers of the user.

In a preferred and non-limiting embodiment of an aspect of the present invention, the touchscreen-based control system 100 includes a touchscreen device 110 in operative communication with a massage chair MC.

As best shown in FIGS. 1, 2 and 5-10, touchscreen device 110 preferably comprises a housing 112, a protective layer or surface 113, a touch-sensitive layer or surface 114, a touch controller 116, a processor or operating system 118, a display controller 120, a display layer or surface 122, a main controller printed circuit board (PCB) or motherboard 123, software, software program or application (app) 124 comprising providable information that may be provided to a user in response to touch inputs from the user, and software, software program or application (app) 126 in operative communication with the massage chair MC. The touchscreen device 110 may be an LCD touchscreen device, an LED touchscreen device, or any other type of touchscreen device known to one of ordinary skill in the art.

Figure 10:
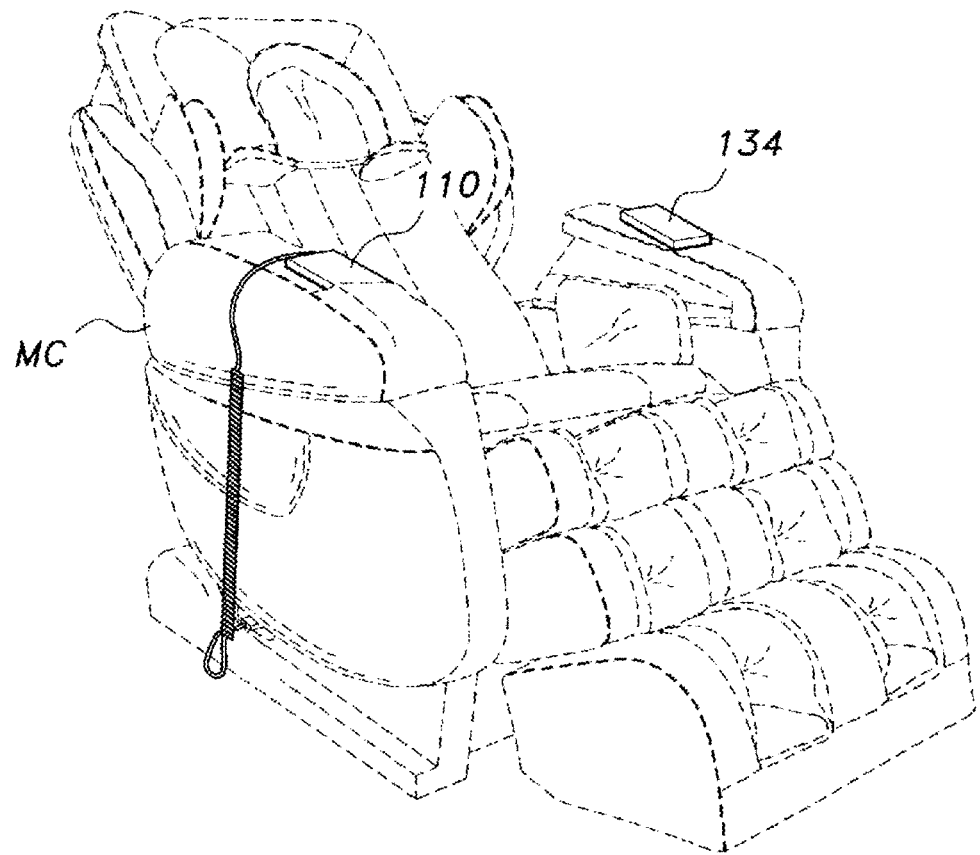
FIG. 10 is an environmental, perspective view of a touchscreen-based control system according to the present invention, showing a touchscreen device and a remote control.
Figure 11:
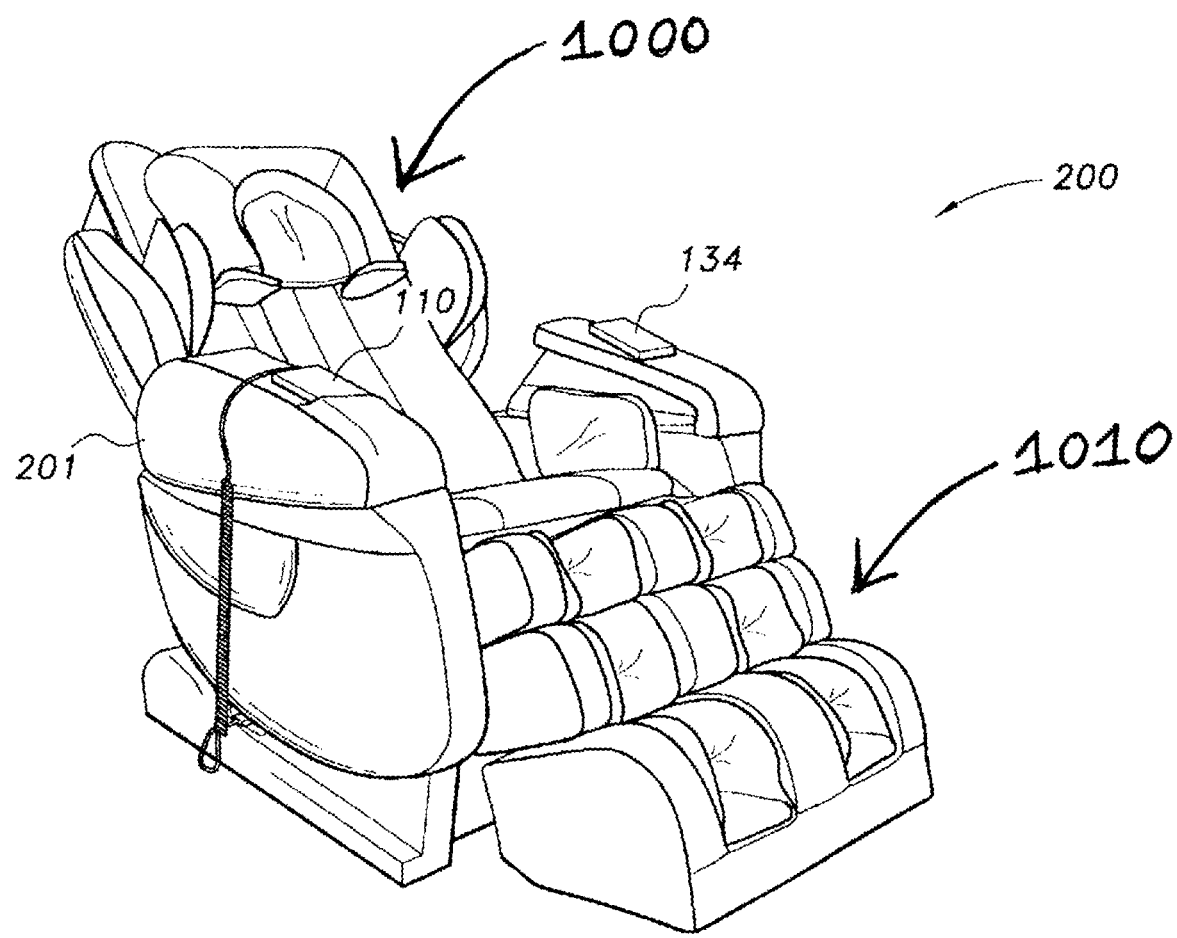
FIG. 11 is a perspective view of a massage chair controlled by touchscreen-based control system according to the present invention.

As best shown in FIGS. 1 and 10, the housing 112 preferably houses most or all of the components of the touchscreen device 110. The housing 112 may be any housing known to one of ordinary skill in the art.

As best shown in FIGS. 1 and 5-9, the protective layer or surface 113 protects the touch-sensitive layer or surface 114 and possibly other components housed in the touchscreen device 110 from damage or breakage arising from scratches, device drops, fluid spills, etc. For best effectiveness, it is preferred that the protective layer or surface 113 is a transparent, protective layer or surface. The transparent, protective layer or surface 113 may be any transparent, protective layer or surface known to one of ordinary skill in the art.

As best shown in FIGS. 1 and 5-9, the touch-sensitive layer or surface 114 receives touch inputs from the user (not shown) to communicate with the massage chair MC whereby the massage chair MC communicates with a massage device (not shown) of the massage chair MC to provide massage effects to the user. For best effectiveness, it is preferred that the touch-sensitive layer or surface 114 is a transparent, touch-sensitive layer or surface. The transparent, touch-sensitive layer or surface 114 may be any transparent, touch-sensitive layer or surface known to one of ordinary skill in the art.

Figure 2:
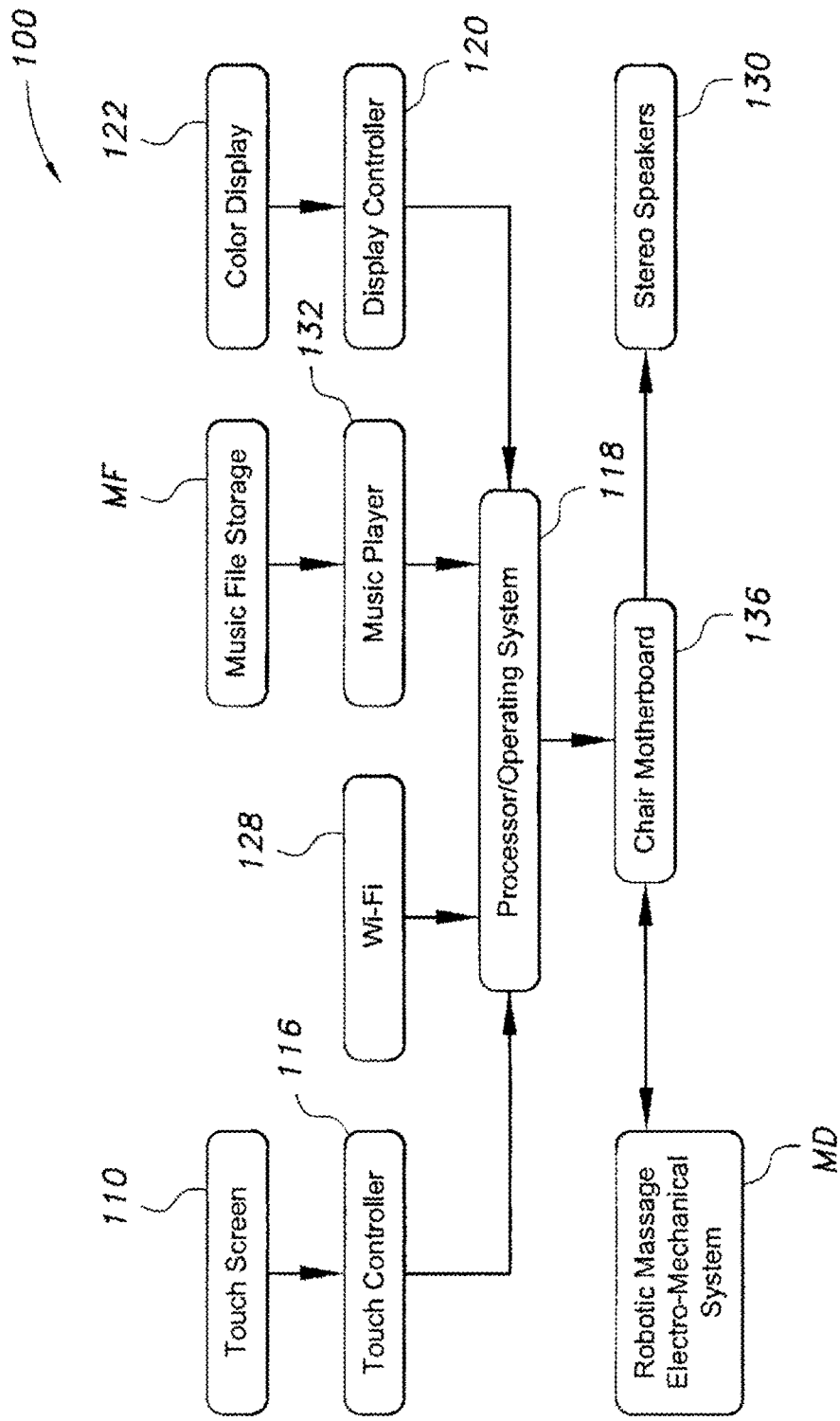
FIG. 2 is a block diagram of a non-limiting example of a hardware system of a touchscreen-based control system according to the present invention, showing the touchscreen-based control system in communication with a massage chair.

As best shown in FIG. 2, the touch controller 116 identifies touch inputs from the user. The touch controller 116 may be any touch controller known to one of ordinary skill in the art.

As best shown in FIG. 2, the processor 118 processes the touch inputs and operatively communicates with the display controller 120. The processor 118 may be any processor or operating system known to one of ordinary skill in the art.

As best shown in FIG. 2, the display controller 120 generates video signals of the selected information and/or selected selection SI to be displayed on the display surface 122. The display controller 120 may be any display controller known to one of ordinary skill in the art.

As best shown in FIGS. 5-9, the display layer or surface 122 displays the selected information and/or selected selection SI that were derived from the touch inputs. Preferably, the display layer or surface 122 is a graphical display layer or surface. The display layer or surface 122 may be any display layer or surface known to one of ordinary skill in the art.

As best shown in FIG. 1, the main controller printed circuit board (PCB) or motherboard 123 may be any main controller printed circuit board (PCB) or motherboard known to one of ordinary skill in the art.

Figure 3:
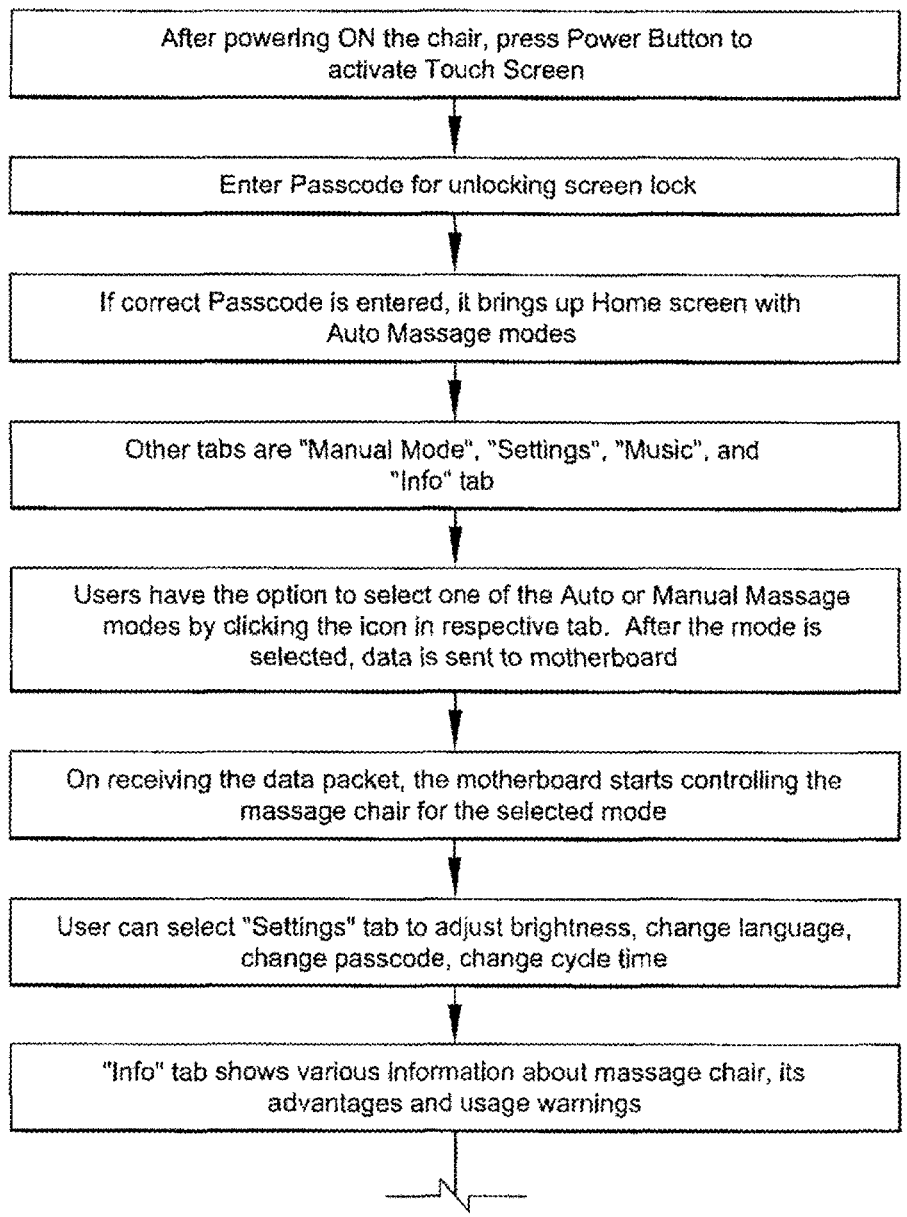
Figure 4:
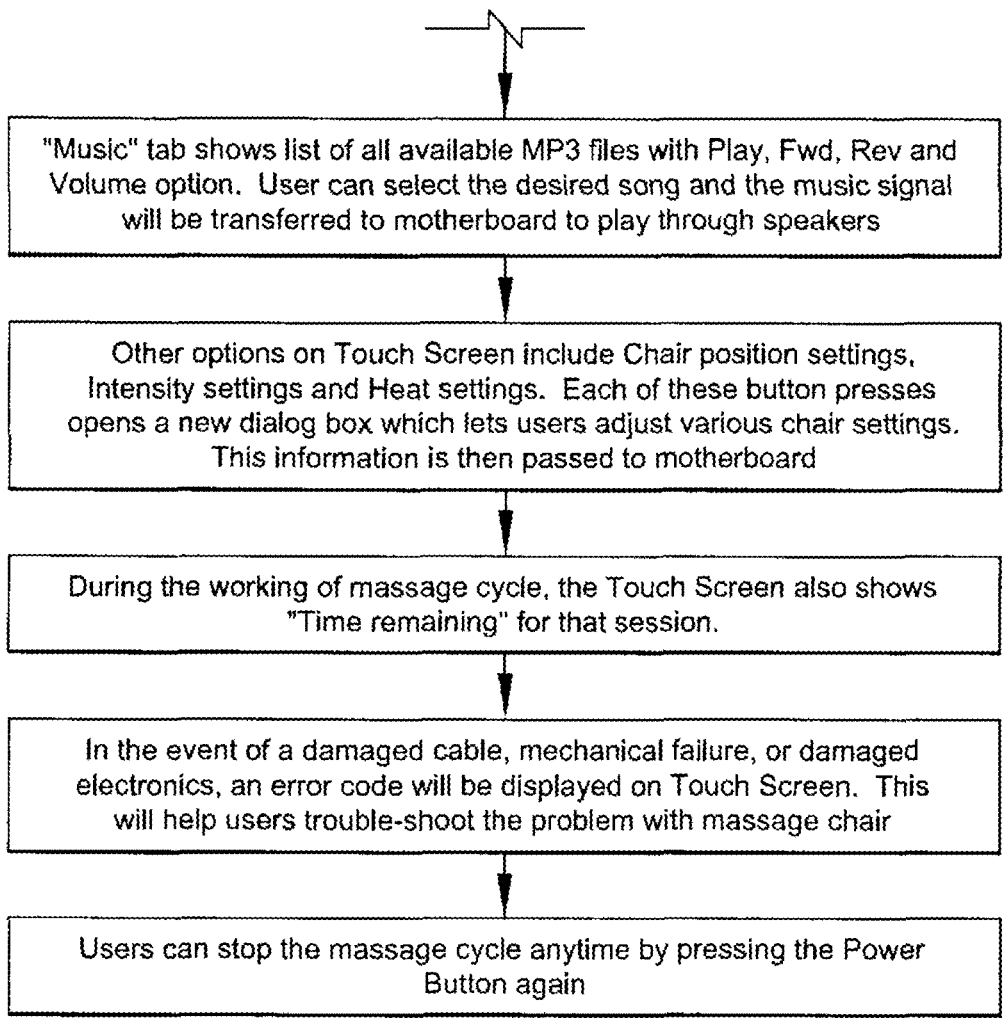
FIG. 4 is a partial flow chart (second portion) of a non-limiting example of a method or process performed by a software system or program of the touchscreen-based control system of FIG. 3, completing the partial flow chart shown in FIG. 3.

As best shown in FIGS. 3 and 4, the software 124 comprises providable information that may be provided to a user in response to touch inputs from the user.

As best shown in FIGS. 3 and 4, the software 126 in operative communication with the massage chair MC effectuates the massage chair MC to communicate with the massage device to provide massage effects to the user in response to the touch inputs.

For simplicity purposes, software 124 and software 126 may be combined into a single software, software program or application (app).

As best shown in FIGS. 5-9, the providable information preferably is accessed and selected by the user through the user's touch inputs of the applicable selectable selections SS and tabs T1, T2, T3, T4, T5. The providable information preferably includes a plurality of selectable massage intensity settings, chair position settings, chair heat settings, and any combination(s) thereof (via applicable selectable selections SS); at least an "Auto" ("Automatic") mode (via the "Auto" tab T1) of massage and a "Manual" mode (via the "Manual" tab T2) of massage; health-related information (via the "Info" tab T5); a plurality of songs stored in a music file MF (via the "Music" tab T4); chair and safety related information (via the "Info" tab T5); and settings (via the "Settings" tab T3) related information, such as, but not limited to, brightness of the display, language of the providable information, passcode, and cycle time. Preferably, certain selectable selections SS, such as the modes of massages; massage pressure levels; massage intensity settings, chair position settings, chair heat settings and any combination(s) thereof; songs; and radio stations, that a user may select are predetermined selections. When the Internet is accessible, then the providable information may also include some, most or all of the information that can be accessed via the Internet.

The touchscreen-based control system 100 or the touchscreen device 110 may further include a device for providing Internet access 128, at least one speaker 130, a music player 132, and a remote control 134 that is in operative communication with the massage chair MC.

As best shown in FIG. 2, the device for providing Internet access 128, preferably via Wi-Fi, allows the user to browse, surf or access the Internet, play games, play music, upgrade system software, etc. Alternatively, the device for providing Internet access 128 may be any known technology or device known to one of ordinary skill in the art.

As best shown in FIG. 2, the at least one speaker 130 is preferably stereo speakers, and may be integrated within the touchscreen device 110, integrated within the massage chair MC, or a separate component. The at least one speaker 130 may be any speaker(s) known to one of ordinary skill in the art.

As best shown in FIG. 2, the music player 132 may be integrated within the touchscreen device 110, integrated within the massage chair MC, or a separate component. The music player 132 may be any music player known to one of ordinary skill in the art.

The remote control 134 may also be used by the user to communicate with the massage chair MC to effectuate desired results. Preferably, the remote control 134 communicates with the massage chair MC via a chair motherboard 136. The remote control 134 may be any remote control known to one of ordinary skill in the art that can operatively communicate with the massage chair MC.

FIG. 1 shows a block diagram of a non-limiting example of a hardware assembly of the touchscreen device 110 of the touchscreen-based control system 100. Preferably, the protective layer or surface 113 is positioned proximately to the top portion of the housing 112 and above the touch-sensitive layer or surface 114; the touch-sensitive surface 114 is positioned above the display layer or surface 122; the display layer or surface 122 is positioned above the motherboard 123; and the motherboard 123 is positioned about the bottom portion of the housing 112.

FIG. 2 shows a block diagram of a non-limiting example of a hardware system of the touchscreen-based control system 100, which is in communication with a massage chair MC.

FIG. 3 shows a partial flow chart (first portion) of a non-limiting example of a method or process performed by a software system or program 124, 126 of the touchscreen-based control system 100.

FIG. 4 shows a partial flow chart (second portion) of a non-limiting example of a method or process performed by the software system or program 124, 126 of the touchscreen-based control system 100, completing the partial flow chart shown in FIG. 3.

Figure 5:
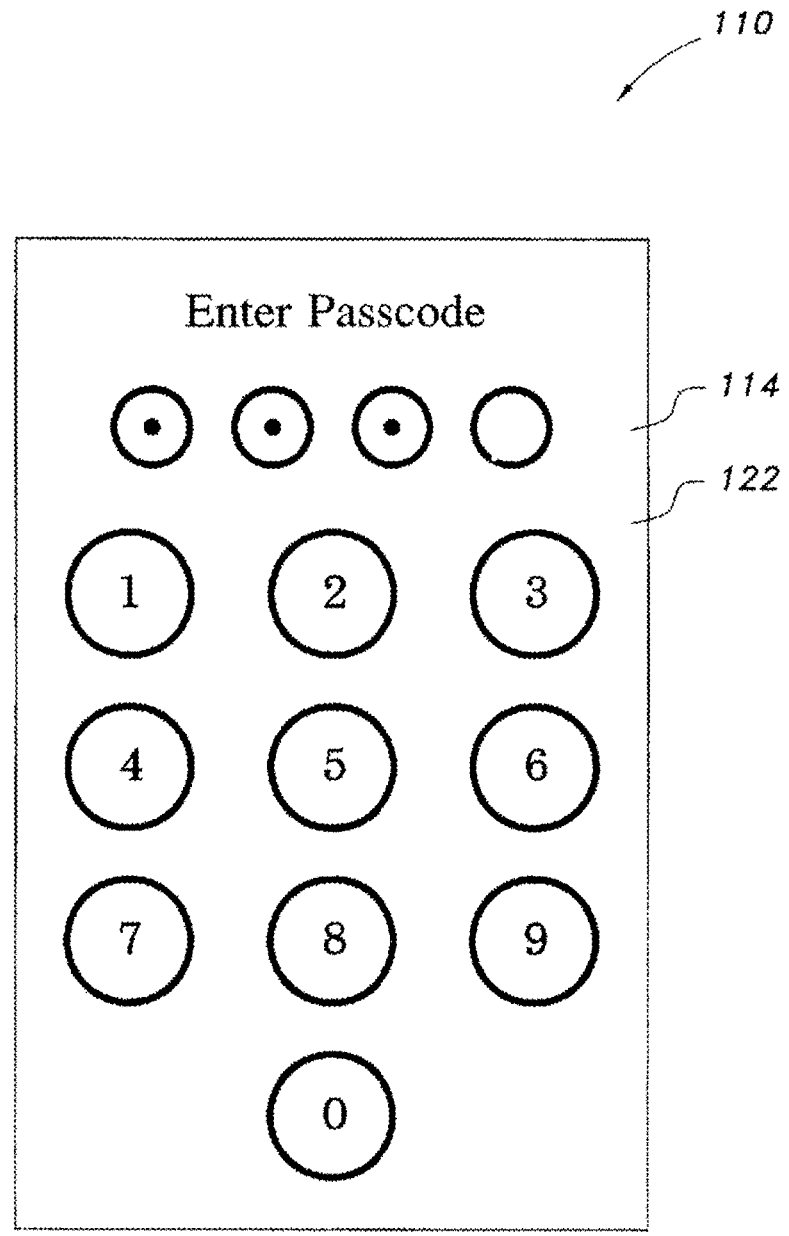
FIG. 5 is a front view of a touchscreen device of a touchscreen-based control system according to the present invention, showing a non-limiting example of an "Enter Passcode" screen page.

FIG. 5 shows a front view of the touchscreen device 110 of the touchscreen-based control system 100, showing a non-limiting example of an "Enter Passcode" screen page.

Figure 6:
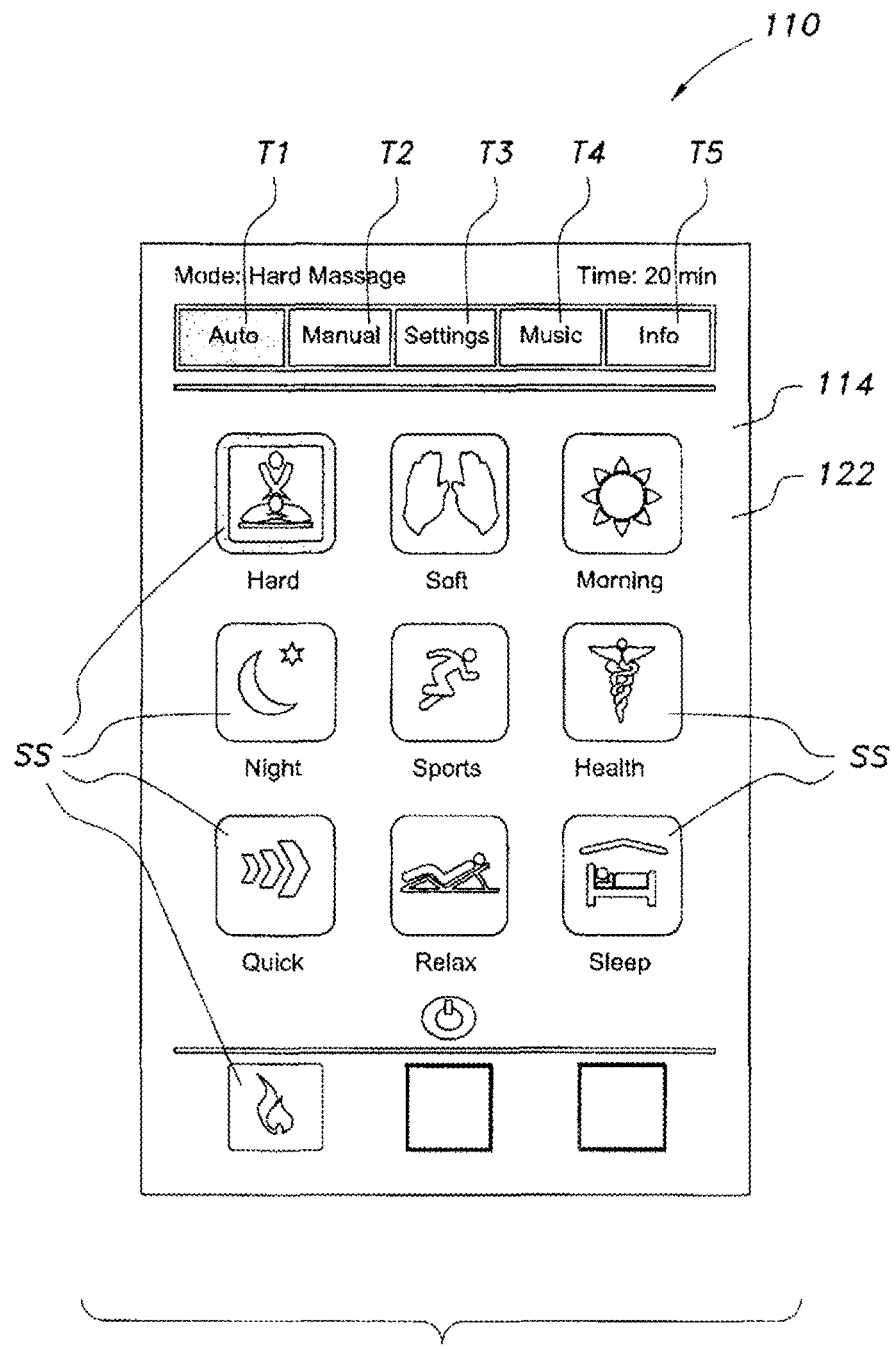
FIG. 6 is a front view of a touchscreen device of a touchscreen-based control system according to the present invention, showing a non-limiting example of a screen page where a user may select selectable selections provided on the screen page.

FIG. 6 shows a front view of the touchscreen device 110 of the touchscreen-based control system 100, showing a non-limiting example of a screen page where a user may select selectable selections provided on the screen page.

Figure 7:
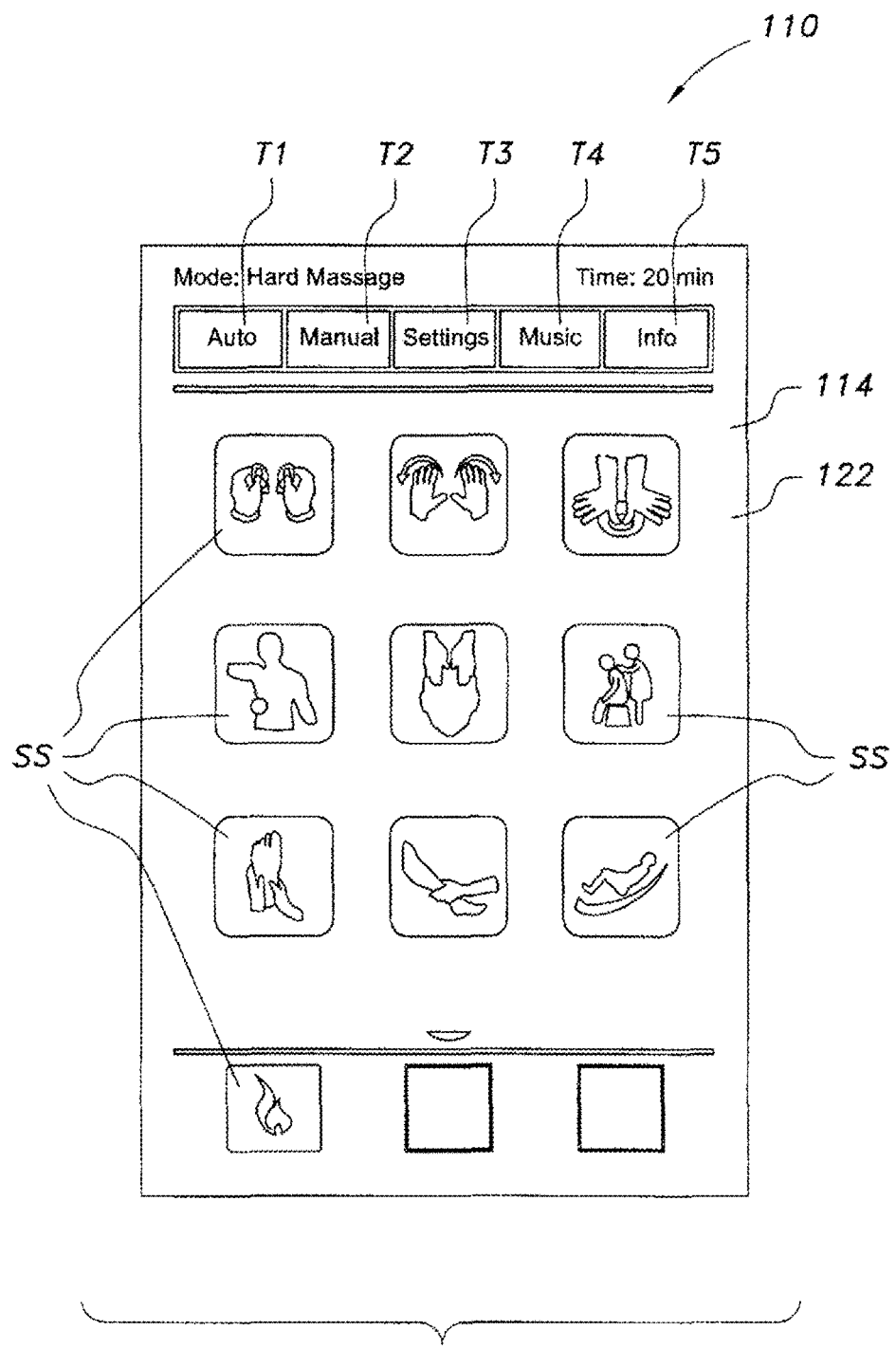
FIG. 7 is a front view of a touchscreen device of a touchscreen-based control system according to the present invention, showing a non-limiting example of another screen page where a user may select selectable selections provided on the screen page.

FIG. 7 shows a front view of the touchscreen device 110 of the touchscreen-based control system 100, showing a non-limiting example of another screen page where a user may select selectable selections provided on the screen page.

Figure 8:
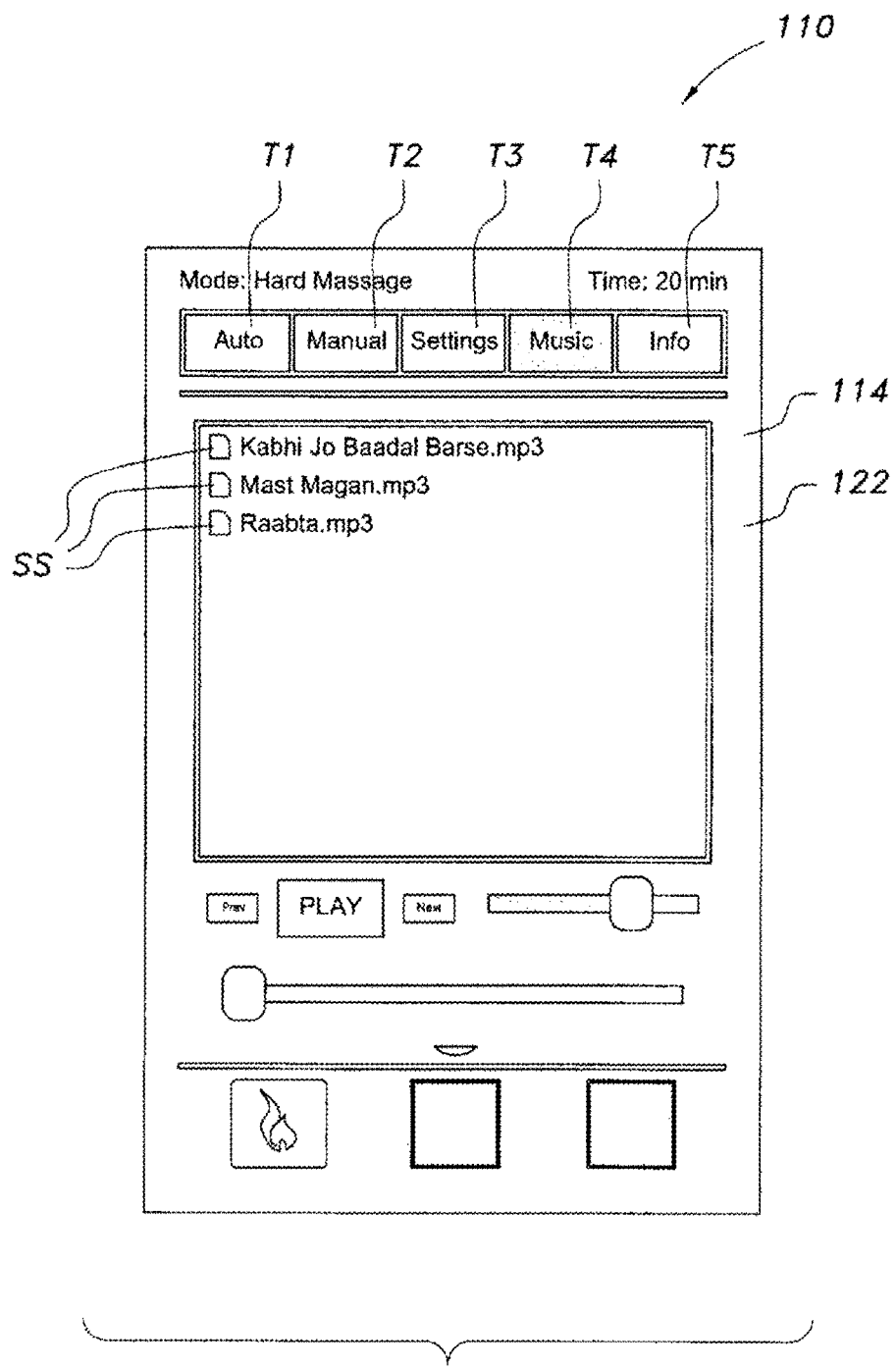
FIG. 8 is a front view of a touchscreen device of a touchscreen-based control system according to the present invention, showing a non-limiting example of an a further screen page where a user may select selectable selections provided on the screen page.

FIG. 8 shows a front view of the touchscreen device 110 of the touchscreen-based control system 100, showing a non-limiting example of a further screen page where a user may select selectable selections provided on the screen page.

Figure 9:
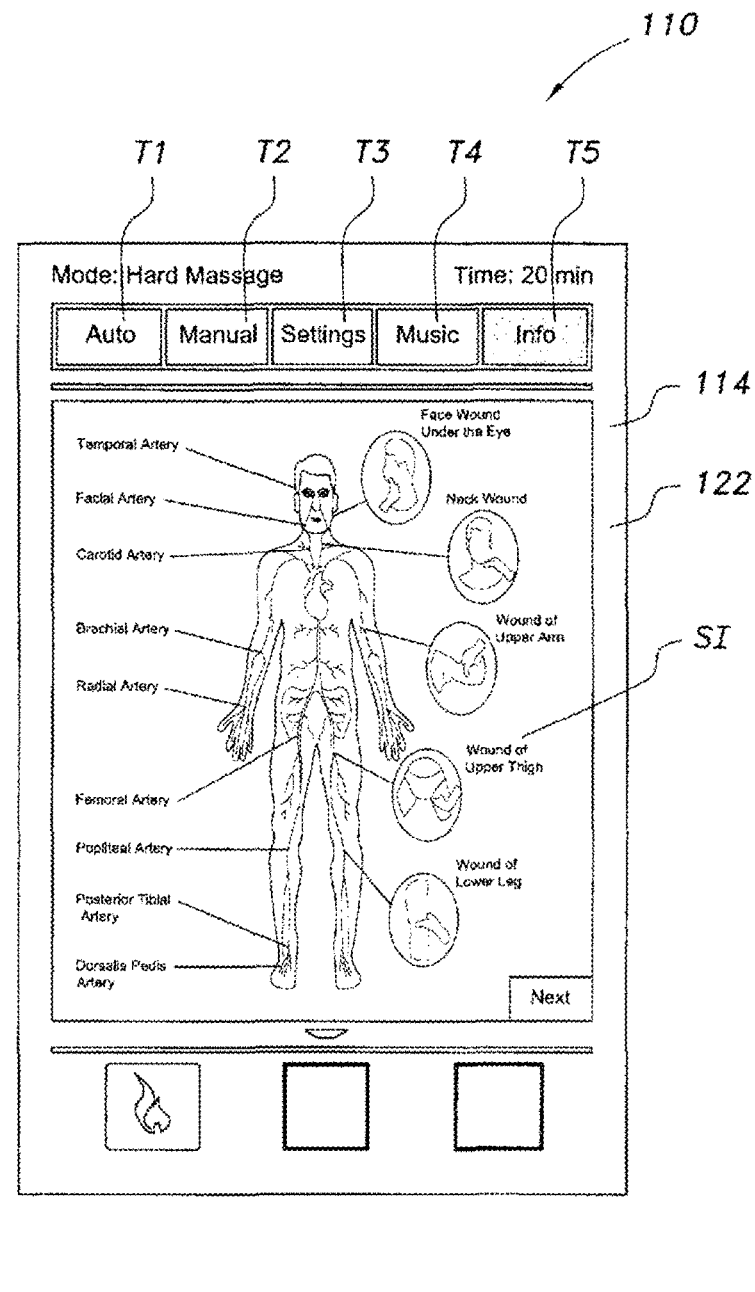
FIG. 9 is a front view of a touchscreen device of a touchscreen-based control system according to the present invention, showing a non-limiting example of an additional screen page where a user may obtain and/or view providable information shown on the screen page.

FIG. 9 shows a front view of the touchscreen device 110 of the touchscreen-based control system 100, showing a non-limiting example of an additional screen page where a user may obtain and/or view provideable information shown on the screen page.

FIG. 10 shows an environmental, perspective view of the touchscreen device 110 and remote control 134 of the touchscreen-based control system 100.

Referring to FIGS. 11-19 and in a preferred and non-limiting embodiment of another aspect of the present invention, the massage chair 200 controlled by a touchscreen-based control system includes a chair 201 comprising a massage device 1170 that provides massage effects to a user, and a touchscreen-based control system comprising a touchscreen device in operative communication with the chair 201. Preferably, the touchscreen-based control system in this aspect of the present invention is the touchscreen-based control system 100 described above.

Preferably, the chair 201 also includes a massage apparatus 1000.

Preferably, the massage apparatus 1000 helps to provide massage benefits or effects to a back body area, a bottom body area, and a thigh body area of a user (not shown). Massage benefits or effects may also be provided to a head and neck body area of the user. The massage apparatus 1000 includes a frame 1100 and the massage device 1170.

Figure 12:
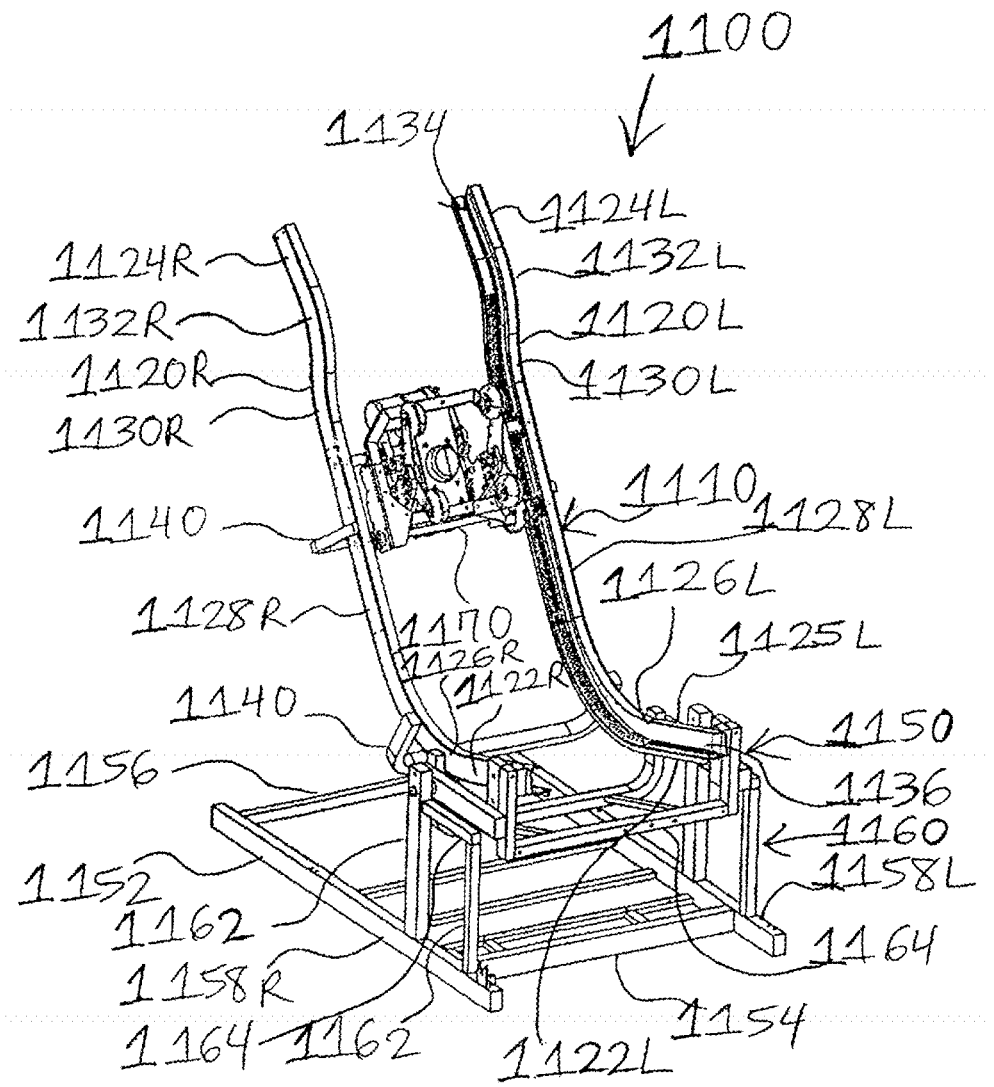
FIG. 12 is a perspective view of a massage apparatus for a massage chair controlled by touchscreen-based control system according to the present invention.
Figure 13:
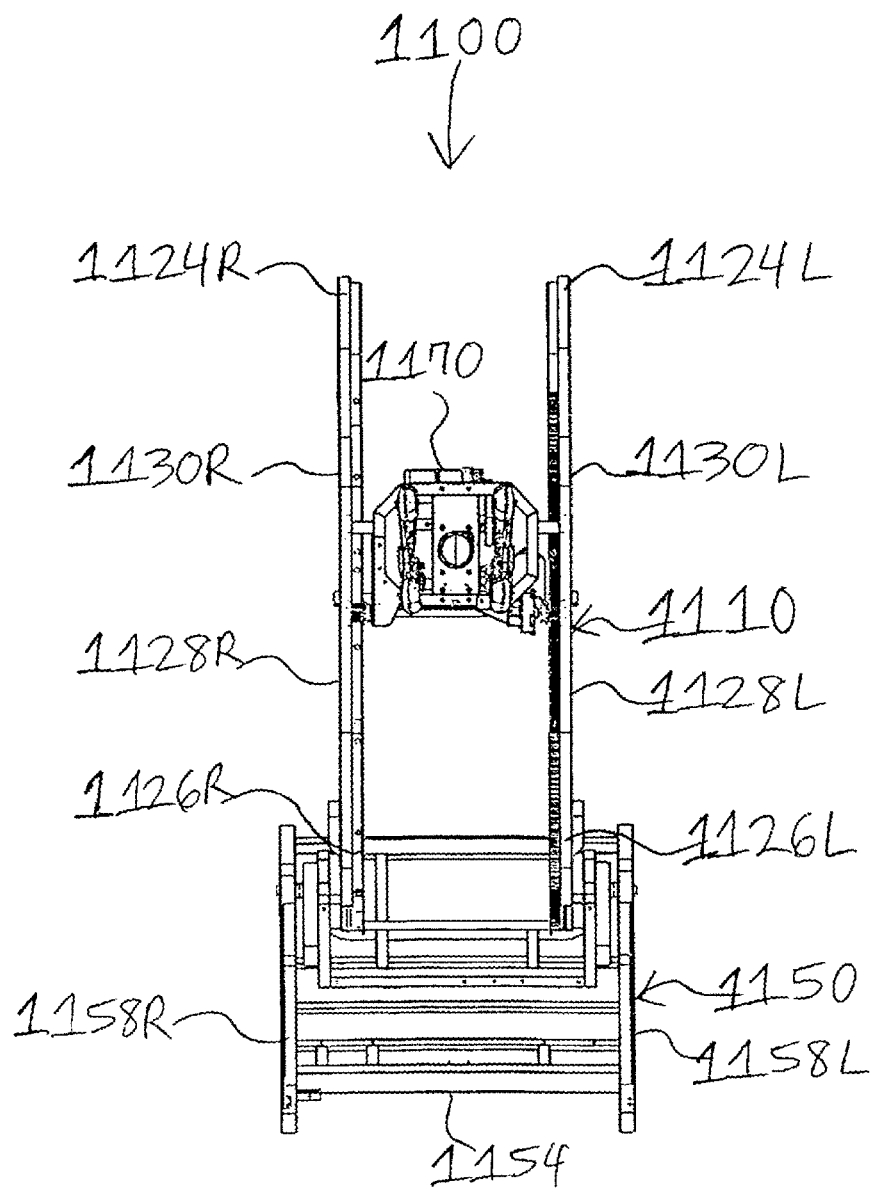
FIG. 13 is a front view of the massage apparatus for a massage chair of FIG. 12.
Figure 14:
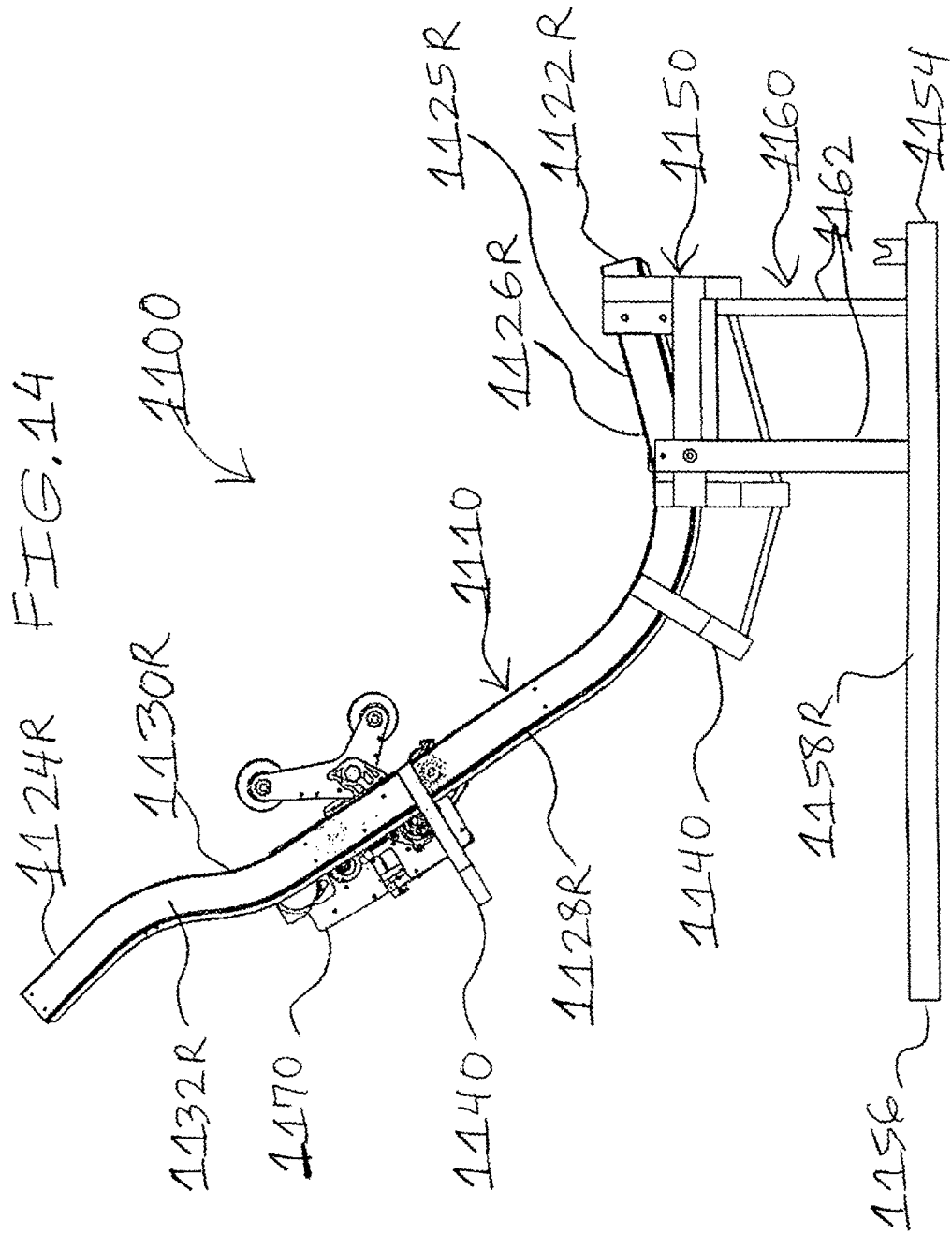
FIG. 14 is a right side view of the massage apparatus for a massage chair of FIG. 12.

As one aspect of the present invention, a non-limiting example, and best shown in FIGS. 12-14, the frame 1100 of the massage apparatus 1000 includes a pair of opposing guide rails 1120R, 1120L, a plurality of guide rails stabilizing bars 1140, and a base stand 1150. The guide rails 1120R, 1120L are secured to the base stand 1150, and are positioned generally above the base stand 1150. The base stand 1150 supports the weights of the guide rails 1120R, 1120L, massage device 1170, and user (not shown) of the massage chair.

Preferably, the guide rails 1120R, 1120L are substantially similar or mirror images of one another. Each of the guide rails 1120R, 1120L includes a first end 1122R, 1122L, a second end 1124R, 1124L, a thigh body area portion 1125R, 1125L located adjacent the first end 1122R, 1122L, a seat or bottom body area portion 1126R, 1126L located adjacent the thigh body area portion 1125R, 1125L and away from the first end 1122R, 1122L, a back body area portion 1128R, 1128L extending upward from the bottom body area portion 1126R, 1126L, a head and neck body area portion 1130R, 1130L extending upward from the back body area portion 1128R, 1128L and located about the second end 1124R, 1124L, an outer side 1132R, 1132L, an inner side 1134, and a guide channel 1136 extending from the thigh body area portion 1125R, 1125L to the back body area portion 1128R, 1128L, preferably to the head and neck body area portion 1130R, 1130L, and running along the inner side 1134 of the guide rail 1120R, 1120L. The guide channel 1136 includes gear teeth 1138 for engaging with at least one gear member from the massage device 1170 when the massage device 1170 moves upward and downward in a generally vertical direction from the first end 1122R, 1122L toward the second end 1124R, 1124L of the guide rail 1120R, 1120L and vice versa, respectively. Preferably, each of the guide rails 1120R, 1120L has a generally "L-shaped" configuration. In this configuration, the lower portion of the "L" includes the thigh body area portion 1125R, 1125L and bottom body area portion 1126R, 1126L, and the upper portion of the "L" includes the back body area portion 1128R, 1128L and head and neck body area portion 1130R, 1130L. As best shown in FIGS. 12 and 14, more preferably, each of the guide rails 1120R, 1120L has a reclining "L-shaped" configuration.

The plurality of guide rails stabilizing bars 1140 help to stabilize the positioning of the guide rails 1120R, 1120L relative to one another. Each of the guide rails stabilizing bars 1140 has a first end 1142, a second end 1144, and a body portion 1146 extending from the first end 1142 to the second end 1144. Preferably, each of the guide rails stabilizing bars 1140 has a generally "U-shaped" configuration. The guide rails stabilizing bars 1140 are secured at predetermined locations along the outer sides 1132R, 1132L of the guide rails 1120R, 1120L.

The base stand 1150 includes a base 1152 and a guide rails support structure 1160. The base 1152 includes a first or front end 1154, a second or rear end 1156, and a pair of opposing sides 1158R, 1158L. The guide rails support structure 1160 is secured about the front end 1154 of the base 1152, and is positioned above the base 1152. The guide rails support structure 1160 includes a plurality of vertical bars or members 1162 and a plurality of horizontal bars or members 1164. The plurality of vertical bars 1162 extend upward from the pair of opposing sides 1158R, 1158L of the base 1152, and, along with the plurality of horizontal bars 1164, form a support frame with a "square-shaped" or "rectangular-shaped" box configuration.

Since the base stand 1150 supports the weights of the guide rails 1120R, 1120L, massage device 1170, and user of the massage chair, the base stand 1150 is preferably made or manufactured of a strong material, such as, but not limited to, steel, metal, wood, hard plastic, any combination of the listed materials, and any material or combination of materials known to one of ordinary skill in the art. Also, the guide rails 1120R, 1120L may be made or manufactured of steel, metal, wood, plastic, any combination of the listed materials, and any material or combination of materials known to one of ordinary skill in the art.

The massage device 1170 includes a power source, at least one massage element, and at least one gear member. The massage device 1170 may be a conventional massage device or any applicable massage device that is known to one of ordinary skill in the art.

As a non-limiting example and as best shown in FIGS. 15-19, the massage device 1170 includes a pair of massage device moving members 1172R, 1172L, a pair of gear members 1174R, 1174L, a pair of massage arms 1180R, 1180L, a first motor 1176, a second motor 1178, a third motor 1190, a rotation shaft 1192 driven by the first motor 1176, a pair of rotation to knocking translator members 1194, a rotation shaft 1195 driven by the second motor 1178, a pair of rotation to kneading translator members 1196, a rotation shaft 1197 for vertical movement gears driving, a speed reduction belt 1198 for the first motor 176, and a speed reduction belt 1199 for the second motor 1178.

Figure 15:
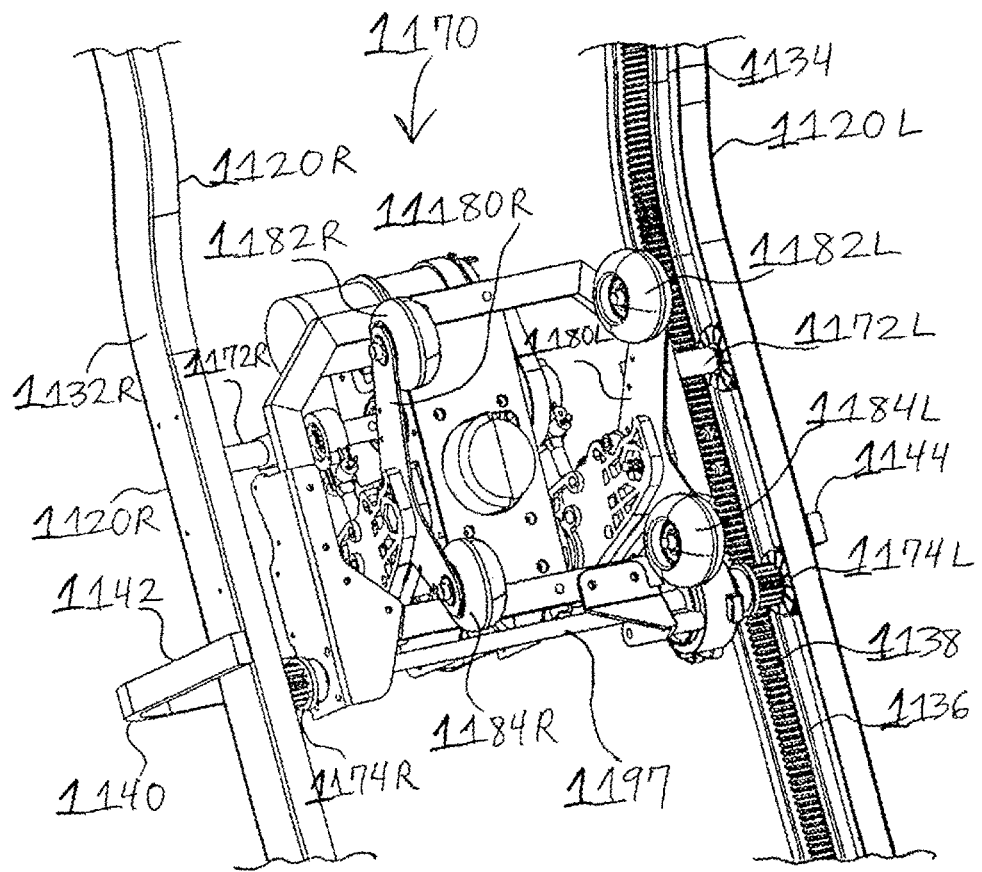
FIG. 15 is a perspective, front view of a massage device of the massage apparatus for a massage chair of FIG. 12.
Figure 16:
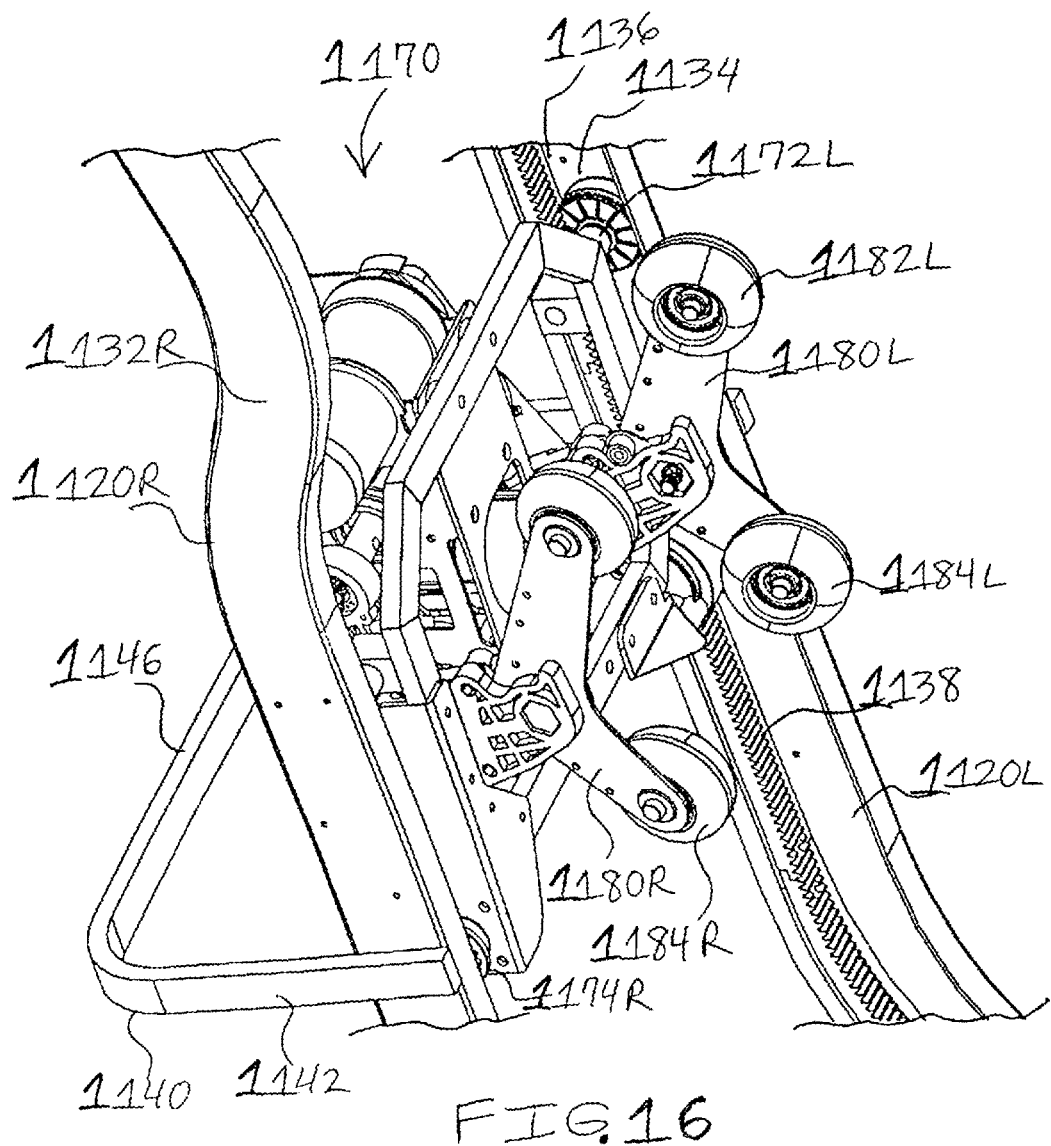
FIG. 16 is a perspective, front and right side view of a massage device of the massage apparatus for a massage chair of FIG. 12.

As best shown in FIGS. 15 and 16, each of the pair of massage device moving members 1172R, 1172L is positioned within a corresponding guide channel 1136 of a guide rail 1120R, 1120L, and helps the massage device 1170 move in a generally vertical direction along the guide channel 1136.

As best shown in FIGS. 15 and 16, each of the pair of gear members 1174R, 174L is positioned within a corresponding guide channel 1136 of a guide rail 1120R, 1120L, and engages with the teeth 1138 located in the corresponding guide channel 1136.

As best shown in FIGS. 15-19, each of the pair of massage arms 1180R, 1180L includes a first or upper massage roller 1182R, 1182L and a second or lower massage roller 1184R, 1184L. Each of the pair of massage arms 1180R, 1180L can move vertically. As a non-limiting example, each of the pair of massage arms 1180R, 1180L may be able to move both vertically and laterally. The massage rollers 1182R, 1182L, 1184R, 1184L provide massage benefits or effects to a back body area, a bottom body area, and a thigh body area of the user when the massage device 1170 is moved to, near or about that particular body area. The massage rollers 1182R, 1182L, 1184R, 1184L may also provide massage benefits or effects to a head and neck area of the user when the massage device 1170 is moved to, near or about the head and neck area. It will be understood by one of ordinary skill in the art that the timing of the pattern of the raising and lowering may be varied on each roller 1182R, 1182L, 1184R, 1184L, such as by adjusting the degree of rotation of one or more of the following: rotation shaft 1192 driven by the first motor 1176, pair of rotation to knocking translator members 1194, rotation shaft 1195 driven by the second motor 1178, pair of rotation to kneading translator members 1196, speed reduction belt 1198 for the first motor 1176, and speed reduction belt 1199 for the second motor 1178. Also, it will be understood by one of ordinary skill in the art that the rate of speed of rotation as well as the direction of rotation of the rollers 1182R, 1182L, 1184R, 1184L may be adjusted by varying the motor speed or direction.

Figure 17:
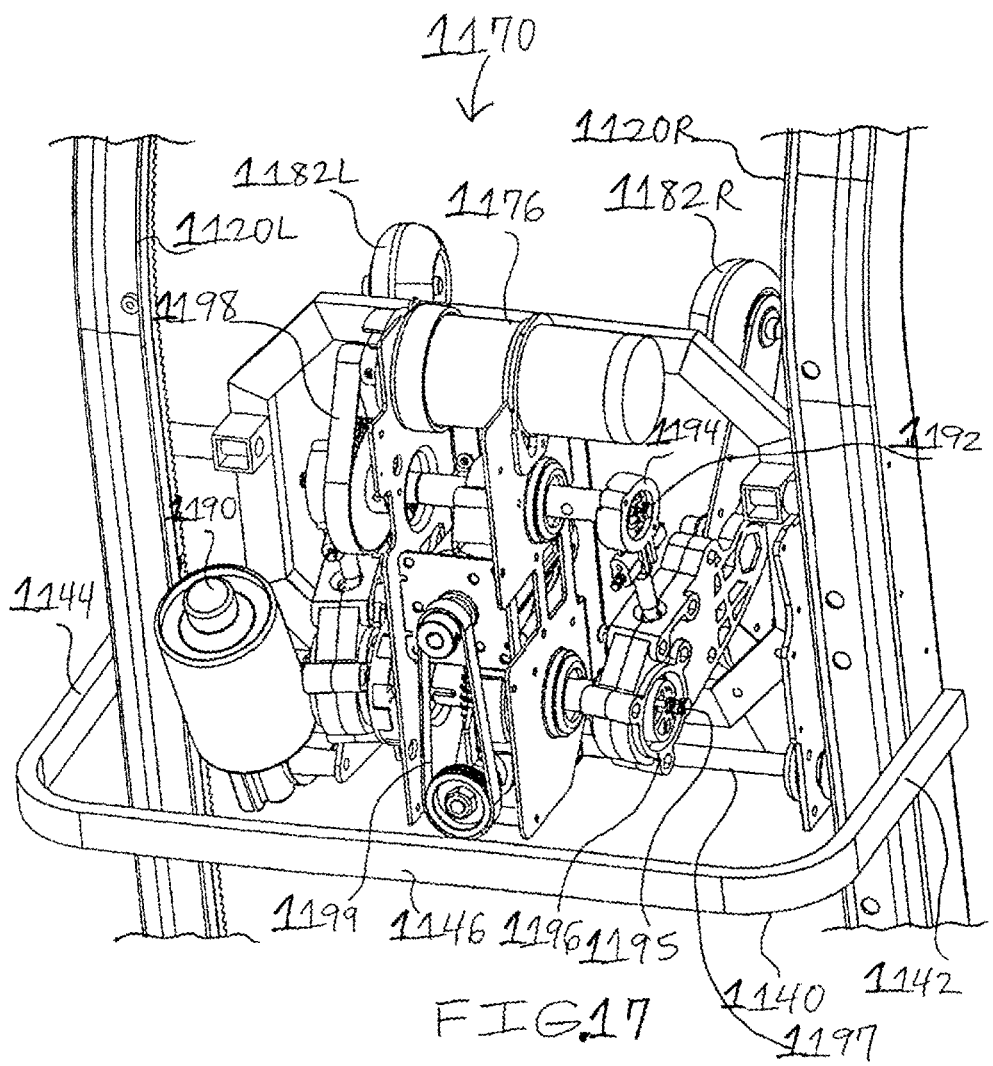
FIG. 17 is a perspective, rear view of a massage device of the massage apparatus for a massage chair of FIG. 12.
Figure 18:
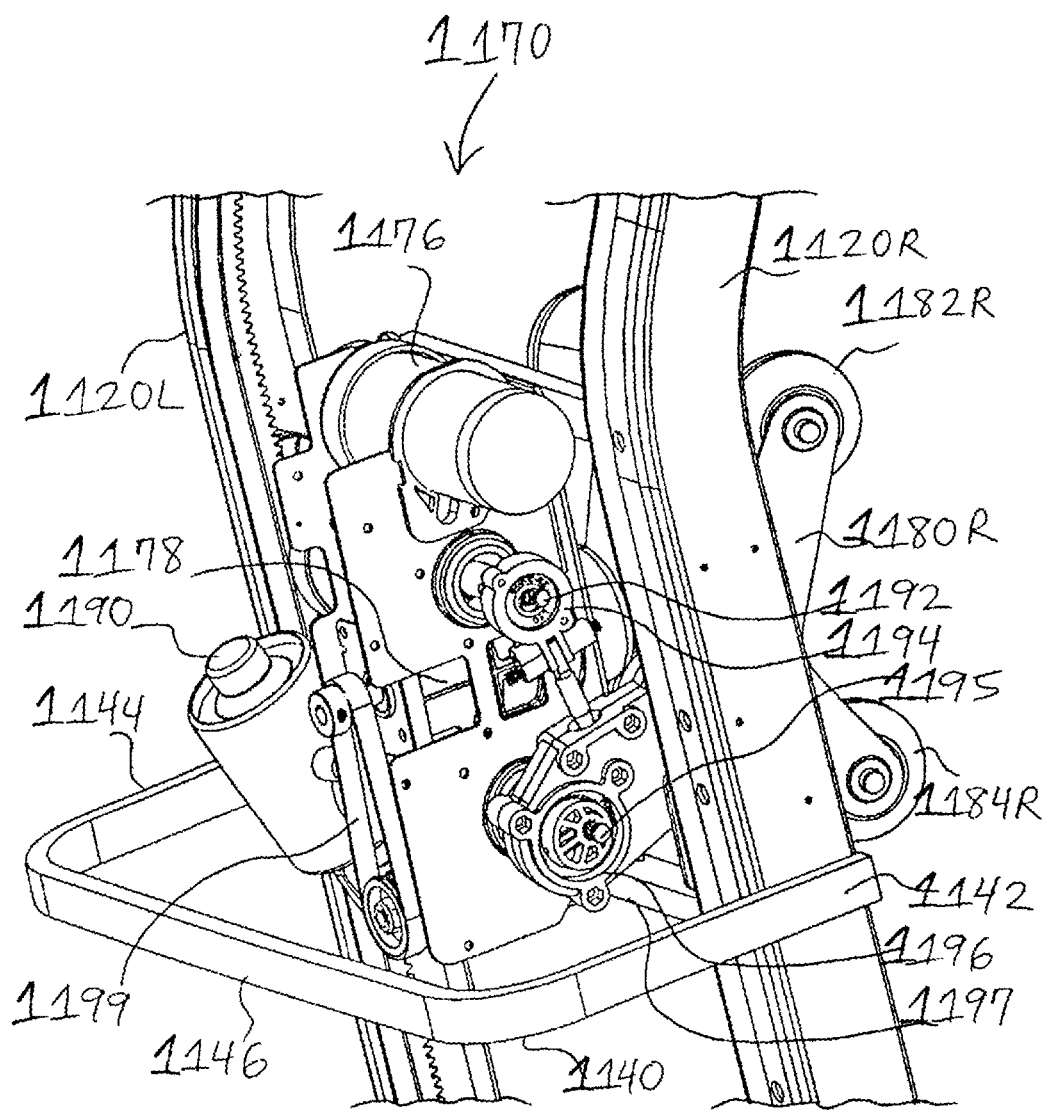
FIG. 18 is a perspective, rear and right side view of a massage device of the massage apparatus for a massage chair of FIG. 12.
Figure 19:
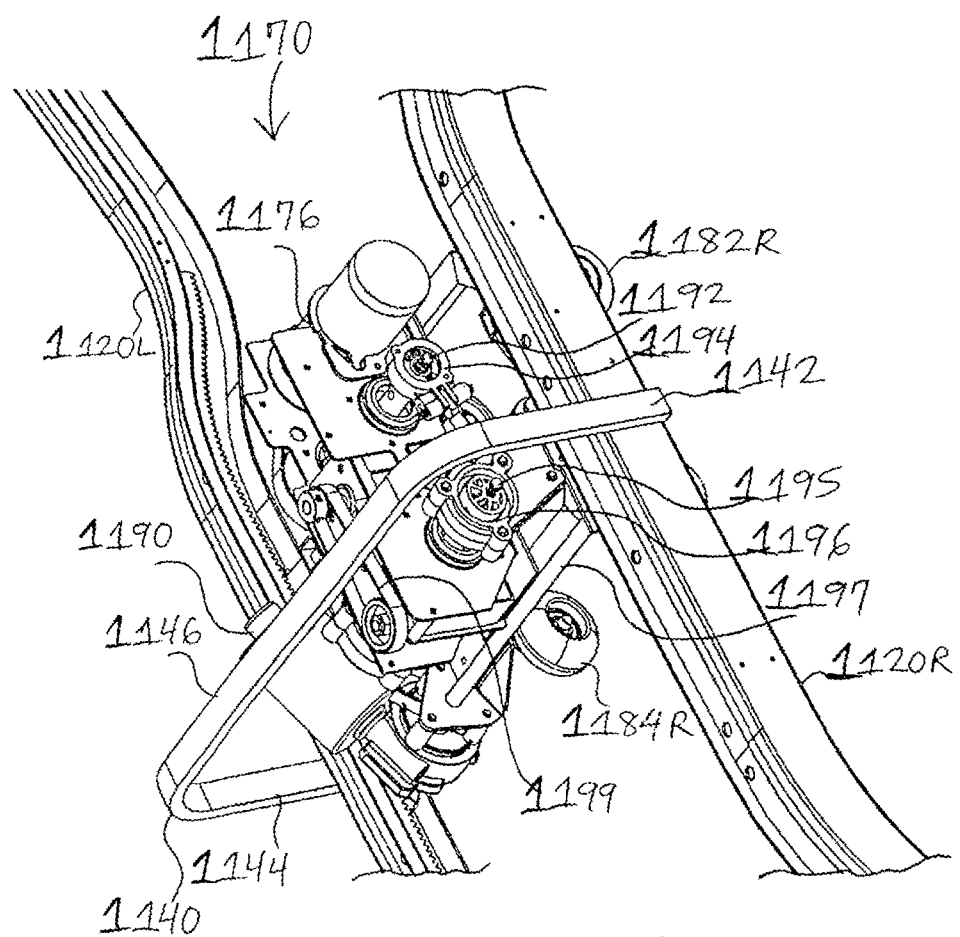
FIG. 19 is another perspective, rear and right side view of a massage device of the massage apparatus for a massage chair of FIG. 12.
Figure 20:
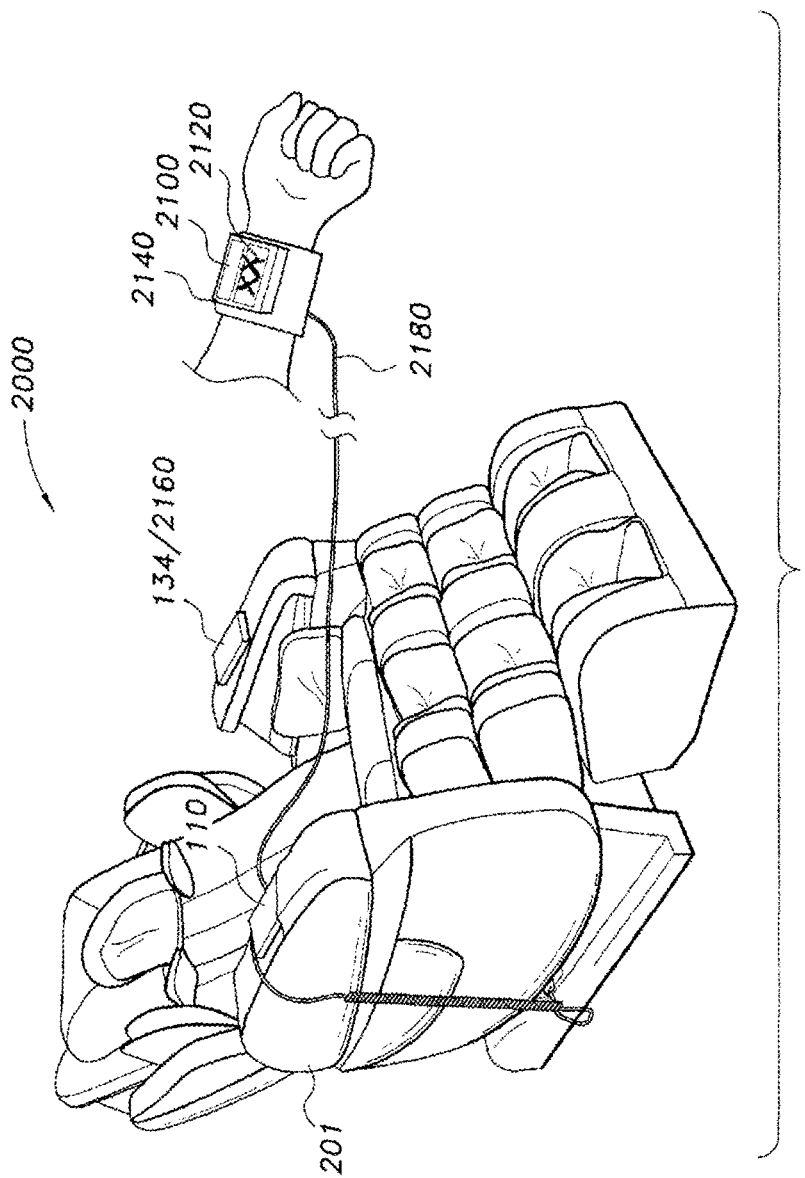
FIG. 20 is an environmental, perspective, front and right side view of a massage chair controlled by touchscreen-based control system according to the present invention, showing at least one health monitoring device or system being positioned on or secured to a user.

As best shown in FIGS. 17-19, the first and second motors 1176, 1178 provide power to the pair of massage arms 1180R, 1180L, respectively, while the third motor 1190 provides power for the generally vertical movement of the massage device 1170.

As best shown in FIGS. 17-19, the rotation shaft 1192 driven by the first motor 1176 causes the first massage arm 1180R to be activated and to carry out its massage actions when this rotation shaft 1192 is rotated.

As best shown in FIGS. 17-19, each of the pair of rotation to knocking translator members 1194 assists the corresponding massage arm 1180R, 1180L and corresponding massage roller(s) 1182R, 1182L, 1184R, 1184L to carry out its knocking massage actions when the corresponding rotation shaft 1192, 1195 is rotated.

As best shown in FIGS. 17-19, the rotation shaft 1195 driven by the second motor 1178 causes the second massage arm 1180L to be activated and to carry out its massage actions when this rotation shaft 1195 is rotated.

As best shown in FIGS. 17-19, each of the pair of rotation to kneading translator members 1196 assists the corresponding massage arm 1180R, 1180L and corresponding massage roller(s) 1182R, 1182L, 1184R, 1184L to carry out its kneading massage actions when the corresponding rotation shaft 1192, 1195 is rotated.

As best shown in FIGS. 17-19, the rotation shaft 1197 for vertical movement gears driving causes the massage device 1170 to move upward or downward when this rotation shaft 1197 is rotated.

As best shown in FIG. 17, the speed reduction belt 1198 for the first motor 1176 adjusts the speed of the first massage arm 1180R.

As best shown in FIGS. 17-19, the speed reduction belt 1199 for the second motor 1178 adjusts the speed of the second massage arm 1180L.

When in use or in operation, the user (not shown) may activate the massage device 1170 of the massage apparatus 1000 for a massage chair by or via pushing, touching, using voice command for use on or with, using a mechanical or remote control for use on or with, or any other activation method known to one of ordinary skill in the art, an activation, start, control or command button, touch area, box or panel, or any other activation method or element known to one of ordinary skill in the art. Preferably, the user is able to control the generally vertical movement of the massage device 1170 and massage rollers 1182R, 1182L, 1184R, 1184L upward and downward along the guide rails 1120R, 1120L such that the massage device 1170 and massage rollers 1182R, 1182L, 1184R, 1184L are positioned about, near or at a desired body part area, such as the thighs, bottom, lower back, upper back, and head and neck, of the user so that desired body part area of the user can receive massage effects or benefits from the massage rollers 1182R, 1182L, 1184R, 1184L when desired. Preferably, the user is also able to control the timing, movement, etc. of the massage rollers 1182R, 1182L, 1184R, 1184L such that that the massage rollers 1182R, 1182L, 1184R, 1184L can provide different massage effects or benefits, such as knocking, kneading, etc., to the desired body part area of the user at a particular moment or time.

Referring to FIG. 20 and as another aspect of the present invention, the massage chair 2000 controlled by a touchscreen-based control system includes a touchscreen-based control system, a massage apparatus, and at least one health monitoring device or system 2100. Preferably, the touchscreen-based control system in this aspect of the present invention is the touchscreen-based control system 100 described above. Preferably, the massage apparatus is massage apparatus 1000, described above, that includes the frame 1100 and massage device 1170, or is a massage apparatus that is substantially similar to massage apparatus 1000.

As a non-limiting example shown in FIG. 20, the at least one health monitoring device or system 2100 is a portable, wrist blood pressure and heart rate monitoring device 2100 that is manufactured and/or programmed to measure or obtain the blood pressure and heart rate of the user right at or near the massage chair 2000 when the user is preferably positioned on the massage chair 2000. The blood pressure and heart rate monitoring device 2100 is compact, convenient, and does not interfere with the massage functions of the massage chair 2000. The blood pressure and heart rate monitoring device 2100 provides blood pressure and heart rate measurements, and alerts the user and/or other persons, such as, but not limited to, an individual who is monitoring the user's blood pressure and heart rate. The measurement data 2120 that is obtained from the user is displayed either on the device screen 2140 or on a remote control 2160 of the massage chair 2000. The blood pressure and heart rate monitoring device 2100 can be quickly connected to or disconnected from the massage chair 2000 via a connector or cord 2180, such as, but not limited to, a detachable DC power supply cord.

As an alternative to the blood pressure and heart rate monitoring device 2100 of this embodiment, the at least one health monitoring device 2100 may be a blood pressure monitoring or measuring device and a heart rate monitoring or measuring device that are separate from one another, or just either of those devices. As another alternative to the blood pressure and heart rate monitoring device 2100 of this embodiment, the at least one health monitoring device 2100 may encompass any individual or combinations of health monitoring functions, such as, but not limited to, blood pressure monitoring and/or measuring, heart rate monitoring or measuring, cholesterol monitoring or measuring, fat monitoring or measuring, and blood sugar monitoring or measuring. Alternatively, the at least one health monitoring device 2100 may be or include any health monitoring device(s) that is/are known to one of ordinary skill in the art.

Figure 21:
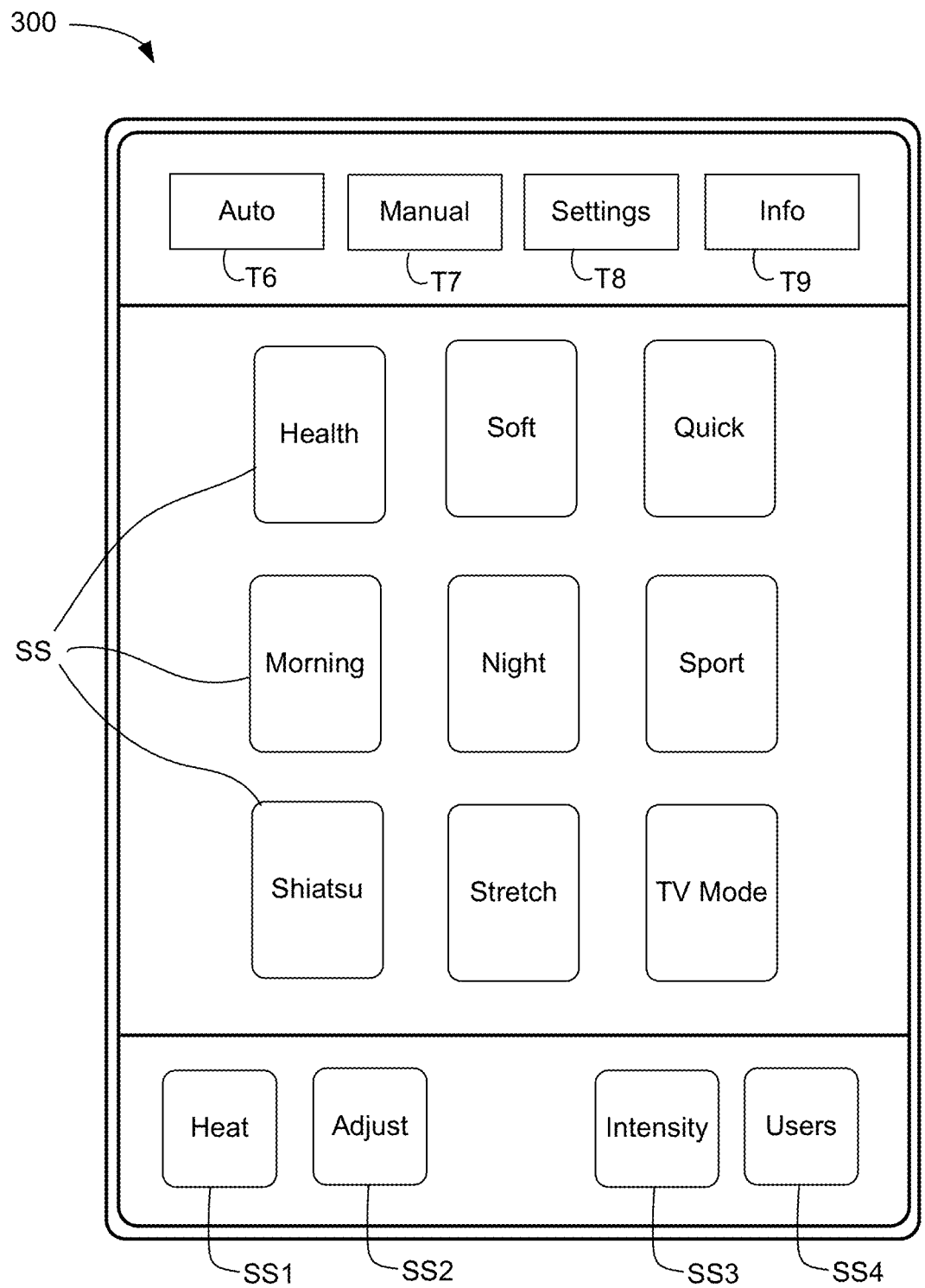
FIG. 21 is a front view of an alternate embodiment of the touchscreen device of FIG. 6.

Referring now also to FIG. 21 in the drawings, a front view of an alternate embodiment of touchscreen device 110 for use with massage chairs is illustrated. Touchscreen device 300 is similar in form and function to that of touchscreen device 110 used in combination with massage chair MC in the prior Figures. Touchscreen-based control system 100 is equally operative with device 300 and/or device 110.

As seen previously with respect to FIGS. 5-9 related to the touchscreen device 110, device 110 was configured to provide information to a user through applicable selectable selections SS and a plurality of tabs T1-T5 via user touch inputs. Device 300 is similar in form and function in that it also uses selectable selections SS and a plurality of tabs T6, T7, T8, and T9 for the selection of a particular mode of operation related to device 300 and/or the massage chair. These modes may include at least an "Auto" ("Automatic") mode (via the "Auto" tab T6); a "Manual" mode (via the "Manual" tab T7); a settings mode (via the "Settings" tab T8); and an information mode (via the "Info" tab T9).

The providable information preferably includes a plurality of selectable selections including a selection for: Health, Soft, Quick, Morning, Night, Sport, Shiatsu, Stretch, and TV Mode. These such selectable selections (SS) are included under the auto tab T6. These selectable selections may be interchanged with or functionable with device 110 as well.

On the lower portion of touchscreen device 300 are particular selectable selections SS1-SS4. These include at least the following: a Heat selectable selection SS1, an Adjust selectable selection SS2, an Intensity selectable selection SS3, and a Users selectable selection SS4. These may be used with any of tabs T6 and T7.

Heat selectable selection SS4 is configured to provide the user control of heaters in the massage chair. The user is able to turn the heat functions of the massage chair on/off and vary the intensity of the heat setting when in the on position.

Adjust selectable selection SS2 is configured to provide the user control of the positioning of various parts of the massage chair so as to regulate the elevation and angled positioning of various parts of the user's body. Through manipulation of selection SS2, the user can reposition at least any of the following: the backrest angle, the leg position and elevation, the leg length, the seat angle, shoulder location of the seatback, and even the massage chair orientation so as to form a zero-gravity condition for the user. The list is not meant to be exhaustive or limiting in any way. It is understood that the massage chair includes isolated operative sections which permit particular control and movements to the user.

In with these basic movable functions, selections SS2 also allows a user to adjust the sensitivity of one or more detection sensors located within the chair. These sensors are used to detect the position of the user in the chair so as to determine size, shape, and location of particular body parts. Such sensors are located within the particular movable portions of the massage chair. Through selection SS4, a user may increase and decrease the sensitivity of each sensor.

Intensity selectable selection SS3 is configured to provide the user control of the intensity or intensity level of the massage on various body parts of the user. For example, selection SS3 may allow control over the intensity related to massages on the neck, mid back, lower back, calves, arms, and feet. The intensity of the massages affecting each area of the body may be increased and/or decreased. Other parts of the body are possible and device 300 is not herein limited to only those parts mentioned.

Users selectable selection SS4 is configured to provide the user with the ability to set up and save a profile. In this profile, the user may save any of the settings made through tabs T6-T9, selectable selections, and SS1-SS4 for recall at a later time. Device 300 is configured to permit the storage of a plurality of profiles. The user may set up a passcode similar to that described with FIG. 5. The profile is saved within the touchscreen-based control system for recall at a later time. It is understood that a user with a saved profile may elect to adjust settings in its profile without saving them, such that the user desires a one-time treatment. The profile allows for a multitude of advantages, such as multiple users may share a single chair. Additionally, another advantage is that the users may speed up the time of their treatments as the settings are already saved and waiting selection.

Figure 22:
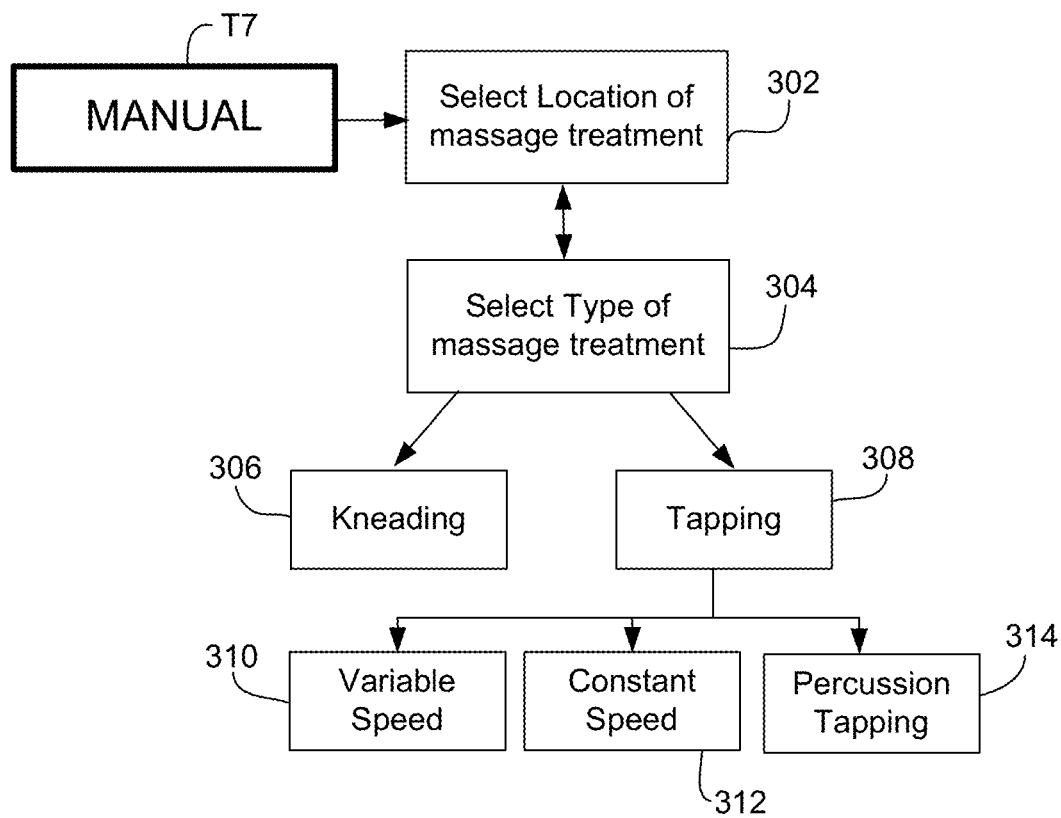
FIGS. 22-23 are schematics of the function of tabs on the touchscreen device of FIG. 21.
Figure 23:
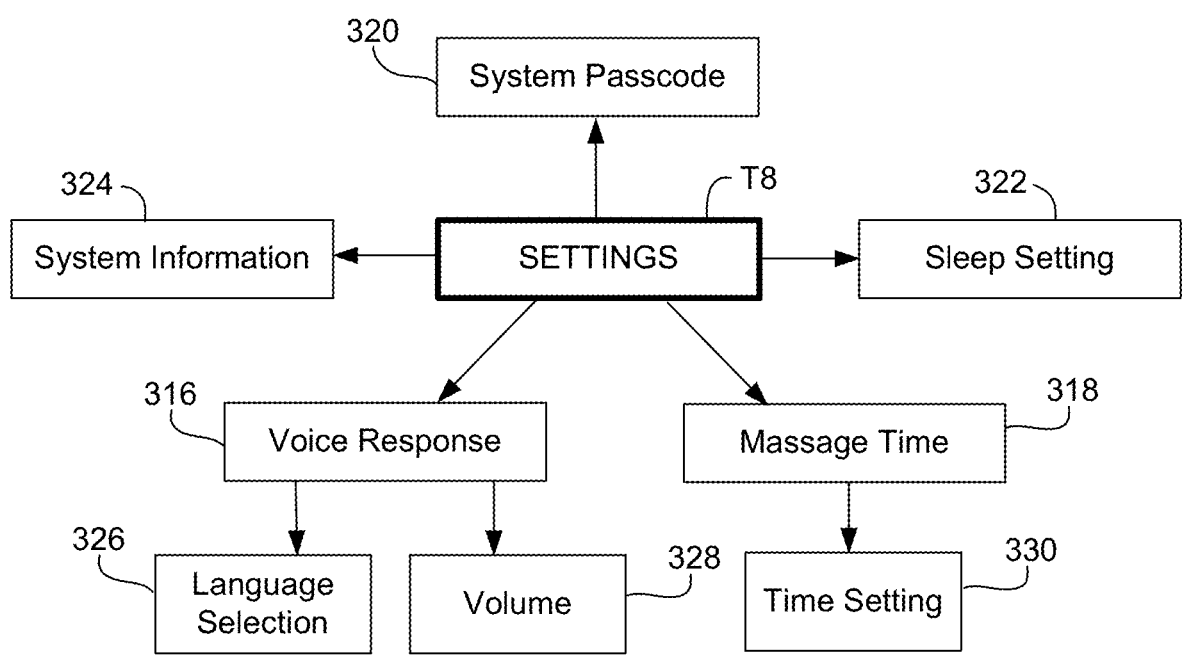

Referring now also to FIGS. 22 and 23 in the drawings, schematics of a portion of the tabs used in device 300 is illustrated. With respect to tabs T6-T9, various modes of device 300 may be selected by the user. In the auto mode tab T6, the user is permitting the massage chair to use one or more sensors to detect the muscular and overall physical condition of the user. Through a scan performed, the touchscreen-based control system and chair initiate a determined treatment. The user may augment or also select the selectable selections in an effort to customize particular features of the massage chair treatment for this particular use. It is conceived that once a scan is performed through tab T6 functions, that such resultant settings may be incorporated by the user through selection SS4 into their profile for recall at a later time.

In particular to FIG. 22, by selecting manual tab T7, the user is permitted to select the precise location 302 of the massage. One or more selections may be made with respect to the location of the body. Some exemplary locations are the forearm, neck, triceps, back, buttocks, hamstring, calves, and feet. Once the location(s) are selected then the user may elect to select the type 304 of the massage. For example, the user may select between a kneading type 306 and a tapping type 308 of massage. The speed may be adjusted for each type of massage. With respect to the tapping type 308, the user may elect to adjust the speed with a variable speed 310, a constant speed, 312, and even change the type of tapping to a percussion tapping 314. Constant speed tapping maintains a consistent speed and rhythm. The variable tapping adjusts the speed similar to a sine wave where the speed ramps up and down in cycles. The percussion tapping incorporates sudden high-speed bursts into the tapping sequence. It is understood that such functions shown in selections 310, 312, and 314 are not limited to only tapping type massages. Other types of massages are possible and the described functions and features may be dispersed with each type in selected embodiments of the system and device 300.

In particular with FIG. 23, the settings tab T8 is configured to provide the user with other functional controls of the treatment and massage chair. For example, under settings tab T8, a user may control Voice Response 316, Massage time 318, System Passcode 320, Sleep Setting 322, and System Information 324. The massage chair is configured to be capable of providing audible and visual feedback to the user. Visual feedback may be provided through device 300 for example. With respect to the audible feedback provided through the massage chair, sound may be emitted through one or more speakers on the massage chair, which may impart feedback related to performance, setting/preference selection, mode selection, and so forth as a user navigates through device 300 and receives treatment. Device 300, through voice response 316, is configured to allow a user to select a preferred language 326 and control the volume 328. Additionally, voice response 316 may include a user selectable multi-languish system for voice response.

Through the massage time selection 318 a user is able to adjust the duration or length of time the massage occurs. The time setting typically relates to the overall cycle time of the massage but selected embodiments may elect to permit control over the time of particular segments of the full cycle. For example, the user could adjust the time at each location of the body if particular locations of the body necessitated more need than others.

The sleep setting 322 is configured to be a safety setting in that the user may at times fall asleep during treatment and therefore not become aware of the ending of the massage. Instead of having the massage chair return to a neutral resting position when the user is asleep, the sleep setting 322 permits the user to continue sleeping in the last chair position when the massage cycle ended. The user may sleep after the massage has ended.

Via system passcode 320 the user may change their passcode. Via system information 324 the user may receive information system specific information related to internal components and performance of device 300.

With respect to information tab T9, device 300 is configured to provide the user with information to help the user become educated about the offered massages, the types of treatment, the settings available for selection, and overall general information. It is understood that when the Internet is accessible, then the providable information may also include some, most or all of the information that can be accessed via the Internet.

Figures 24, 25:
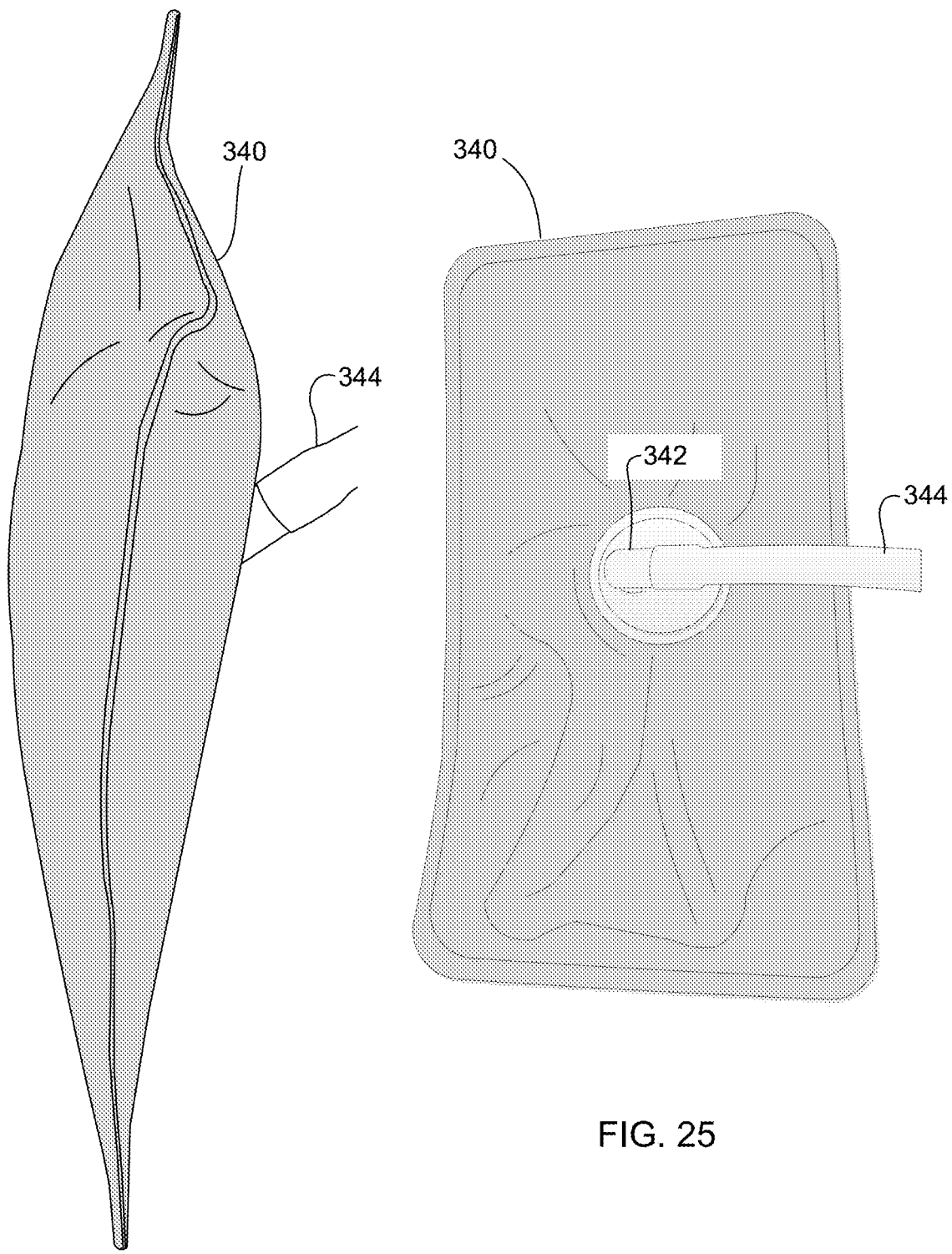
FIGS. 24-25 are views of an air-cell used in a massage chair of the present application.

Referring now also to FIGS. 24-28 in the drawings, adjustable airbags used in combination with the massage chair, system 100, and device 110/300 are illustrated. As seen in FIGS. 24 and 25, airbags 340 (air-cells) are inflatable members configured to hold a selected pressure of air. The air is captured between at least two layers of material. Each airbag 340 is configured to have at least one port 342 to permit the introduction and release of air into the airbag 340. Air is delivered via a line 344 in communication with the port 342. It is understood that the airbags 340 are not limited to a particular material or number of internal chambers. A single chamber may exist or a plurality of internal chambers. The airbags 340 are configured to assist in the performance of massages by the massage chair.

Figure 26:
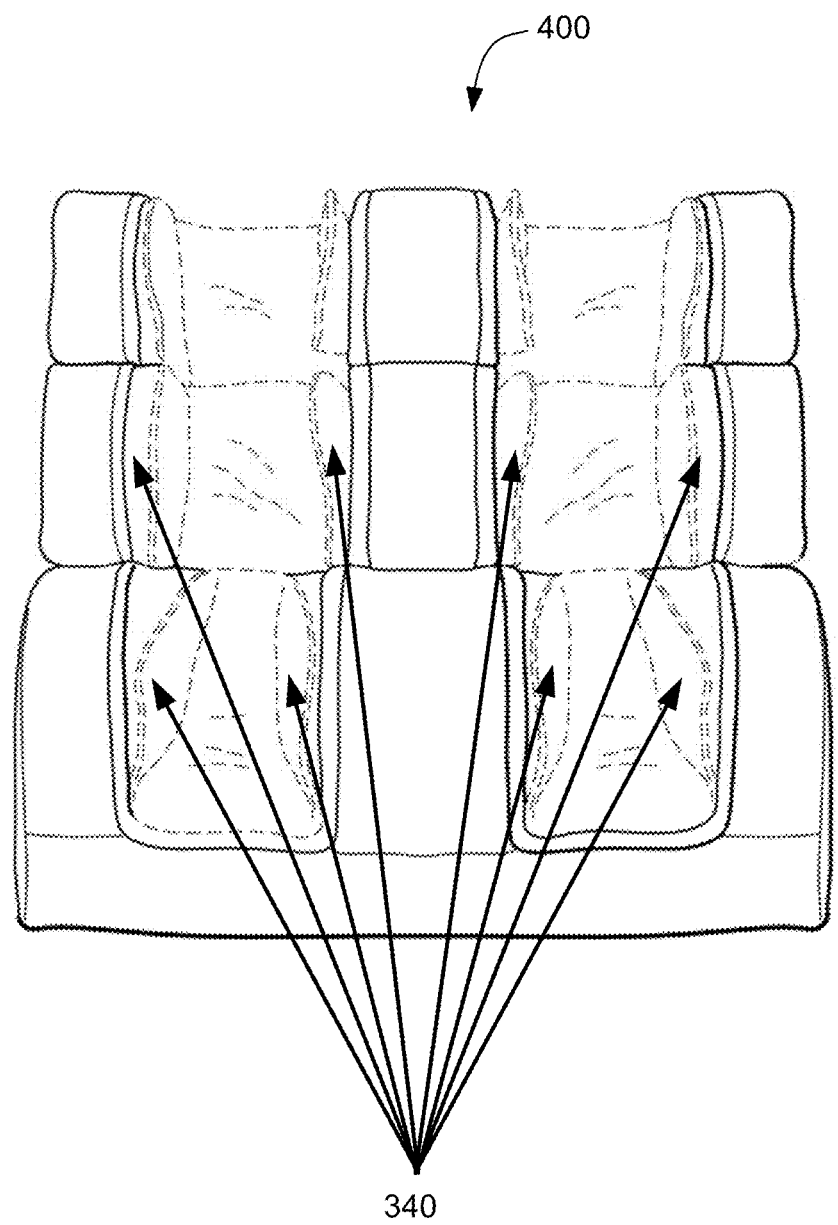
FIGS. 26-28 are assorted views of a massage chair in communication with the touchscreen device of FIG. 21 having the air-cell of FIGS. 24 and 25.
Figure 28:
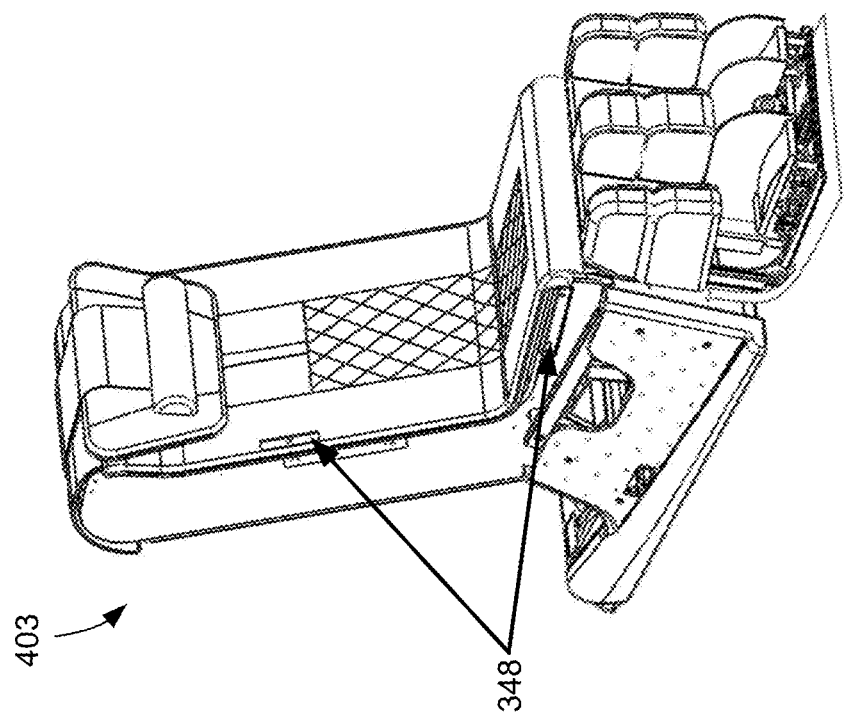
Figure 27:
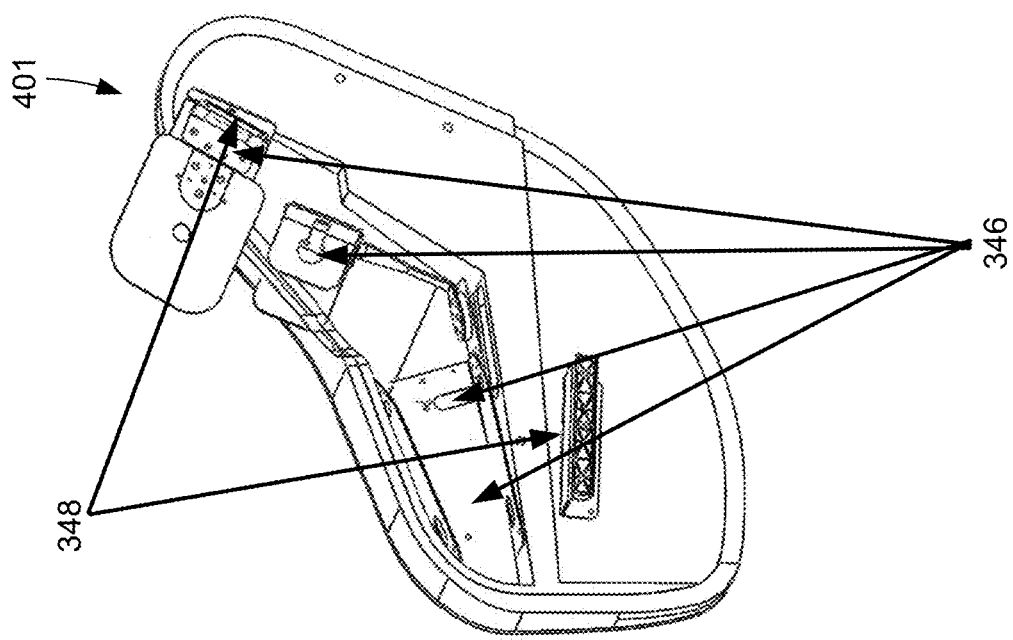

As seen in FIGS. 26-28, the airbags 340 are dispersed about the massage chair 400. Each airbag 340 may be located externally or internally within the massage chair 400. FIG. 26 shows a portion of massage chair 400. It is understood that one or more airbags 340 may be located at each notated position in FIG. 26. It is understood that airbags 340 may at least be located in the armrest and footrests of massage chair 400. Massage chair 400 is similar in form and function to the massage chair MC and other chairs described within FIGS. 1-20. Massage chair 400 further includes a detachable armrest 401 and a main body 403.

In FIGS. 27 and 28, massage chair 400 is shown with armrest 401 and main body 403. Each airbag 340 is configured to mount to armrest 401 at selected locations, such as locations 346 for example. Armrest 401 includes mounting locations 348 configured to include mating structure between armrest 401 and main body 403 to facilitate the coupling of each together.

Figure 29:
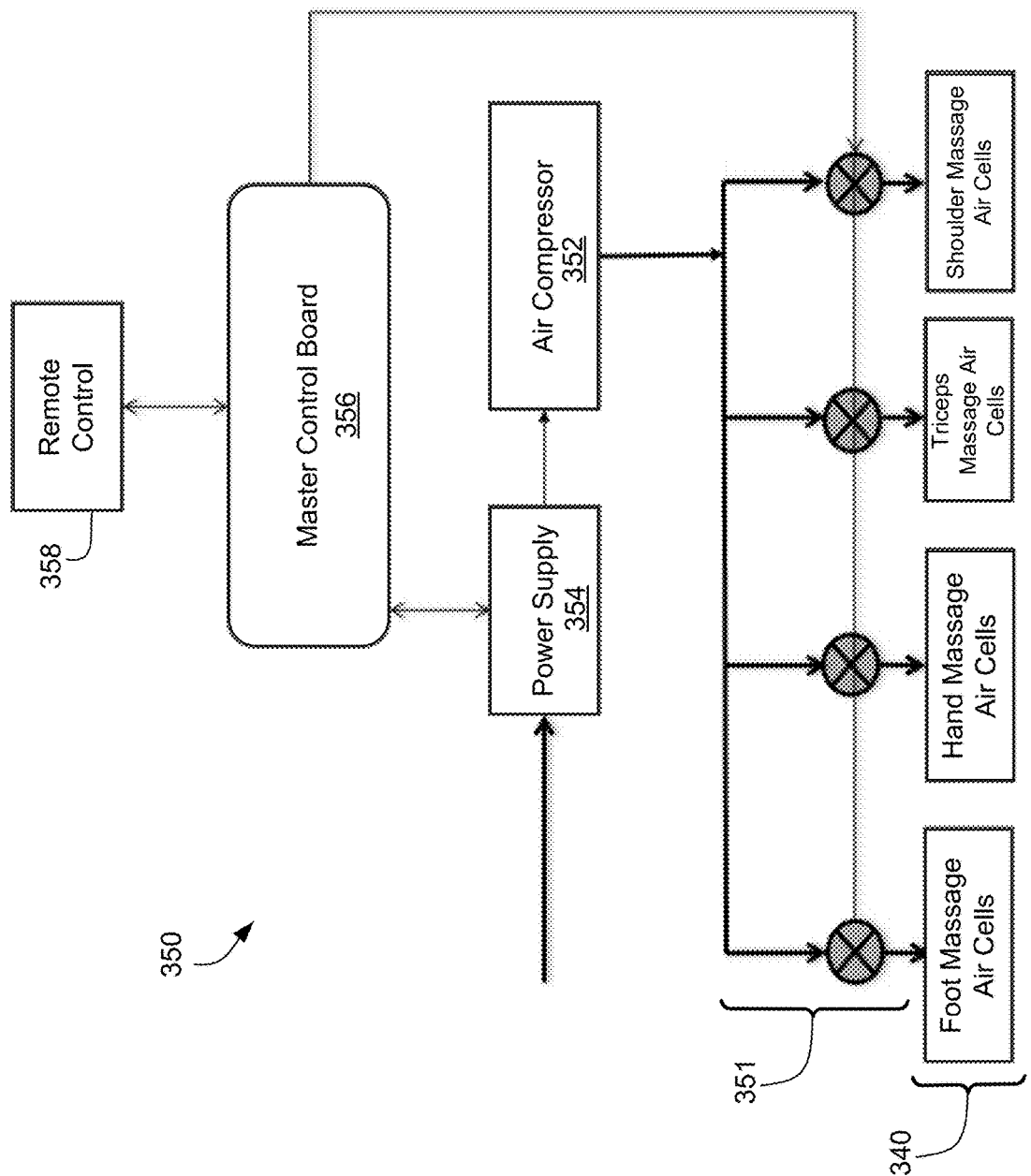
FIG. 29 is a flow chart of an air system used with the massage chair of FIGS. 26-28.

Referring now also to FIG. 29 in the drawings, a flow chart of an air system 350 used in the massage chair 400 with device 300/100 is illustrated. System 350 includes valves 351, an air compressor 352, a power supply 354, a master control board 356, and an optional remote control 358. System 350 regulates the selective filling and draining of air within each airbag 340.

Airbags 340 are configured to be selectively filled and drained of air in an effort to effectuate a massage or treatment to the physical body of the user. Each airbag 340 is coupled in fluid communication to a bank of valves 351, wherein one or more valves are used to regulate the air pressure within the one or more airbags 340. Each valve in the bank of valves 351 is in fluid communication with air compressor 352. Board 356 is configured to regulate operation of valves 351 via electrical current to facilitate the passage of air through valves 351. Power supply 354 provides power. Remote control 358 is configured to provide a user interface to the control of system 350. Remote control 358 may be incorporated into device 300 or be a stand-alone device.

Figure 30:
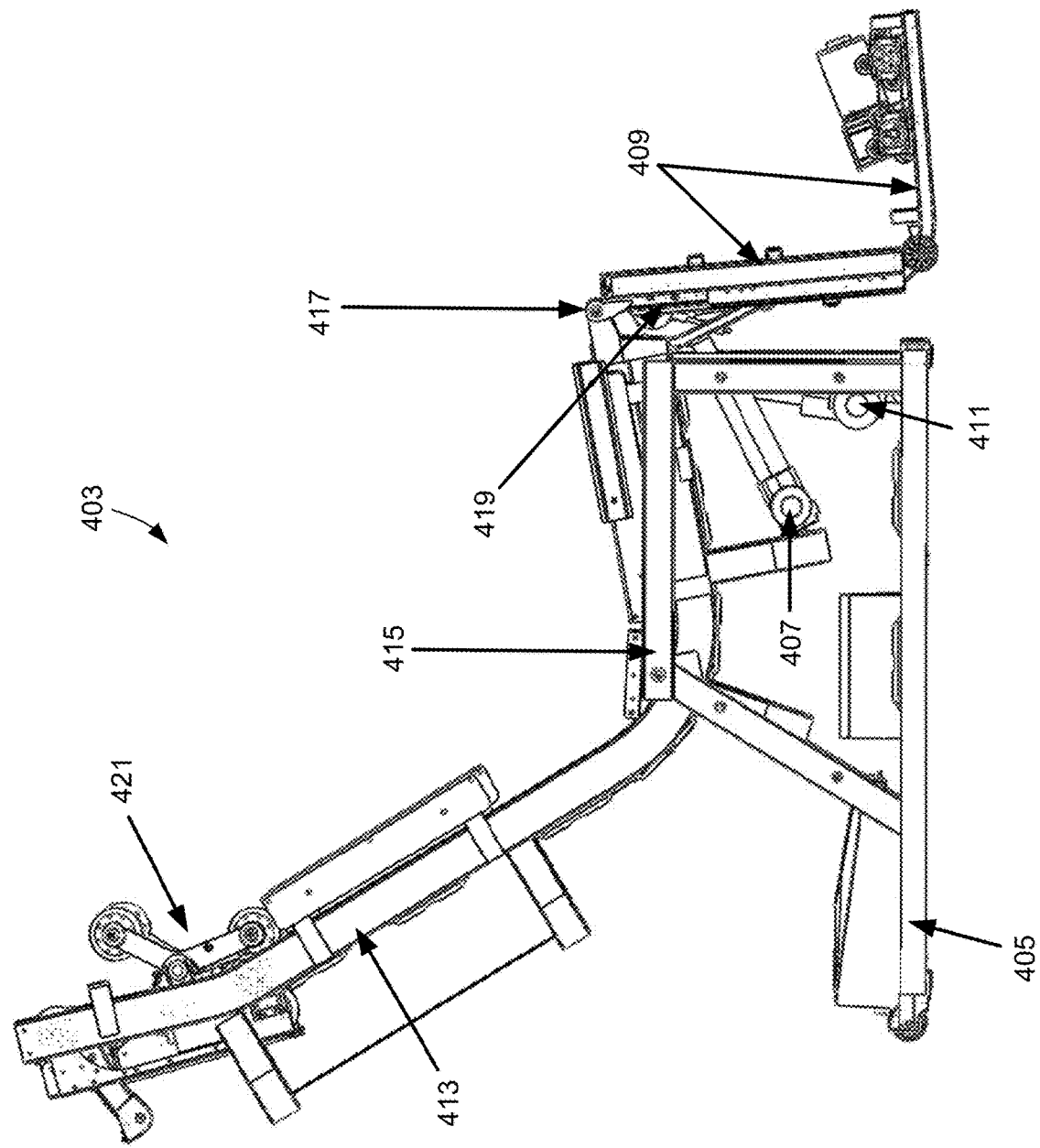
FIG. 30 is a side view of a main body of the massage chair of FIGS. 26-28.

Referring now also to FIG. 30 in the drawings, a side view of main body 403 is illustrated without airbags 340 and external padding so as to show the mechanical structure that lies therein. Main body 403 similar in form and function to frame 1100. Main body 403 includes an assortment of actuators and assemblies to facilitate operation of chair 400. Chair 400 includes a base frame 405 that is typically fixed in orientation and position. Base frame 405 contacts the ground and provides upper support for the seat portion of chair 400.

In communication with base frame 405 is a bidirectional actuator 407 for lifting footrest frame 409, and a bidirectional actuator 411 for lifting backrest frame 413. The backrest frame 413 pivots off base frame 405 along an axis 415 wherein the axis extends between arms of chair 400. Footrest frame pivots about an axis 417 of rotation within the area where the seat portion and the footrest frame 409 meet. Further included is a bidirectional actuator 419 configured to extend footrest frame 409. Chair 400 further includes at least one massage device 421 similar in form and function to massage device 1170. The frame comprises at least a guide rail and a guide channel that provide the track for the massage device 421 to travel along the backrest 413. The footrest and the backrest orientations are adjusted via actuators 407, 411, and 419.

Referring now also to FIG. 31 in the drawings, an enlarged perspective view of main body 403 is illustrated. Mounting points 423 of footrest frame to the main frame are illustrated.

The particular embodiments disclosed above are illustrative only, as the application may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. It is apparent that an application with significant advantages has been described and illustrated. Although the present application is shown in a limited number of forms, it is not limited to just these forms, but is amenable to various changes and modifications without departing from the spirit thereof.

What is claimed is:

1. A touchscreen-based control system for a massage chair, said system comprising:
   a touchscreen device in operative communication with a massage chair that provides massage effects to a body of a user;
   wherein said touchscreen device comprises a housing, touch-sensitive layer, a display layer, a printed circuit board (PCB), a digital processor, a software program that controls the touch sensitive layer and the display layer;
   wherein, the software program allows the user to store at least one user's profile that can be recalled at a later time;
   wherein the user's profile includes body scanning data generated through one or more detection sensors located within movable portions of the massage chair to detect the location of a particular body part of the user, the one or more detection sensors operate based upon pressure applied to the user through a portion of the massage chair.

2. The system of claim 1, wherein when the user selects a selection on said touchscreen device, a control signal is sent to the chair whereby the massage chair turns on or off a massage feature to provide massage effects to a specific body area of the user at a particular moment or time.

3. The system of claim 1, wherein the touchscreen device further includes an internet access interface that allows the user to view internet contents including texts, pictures, and videos on the display layer and also allows the user to update the software for the chair.

4. The system of claim 1, wherein the touchscreen device further includes an internet access interface that allows user to update the software for the chair.

5. The system of claim 1, wherein the software program comprises providable information that may be provided to a user in response to the touch inputs from the user.

6. The system of claim 5, wherein said providable information includes information selected from the group consisting of a plurality of selectable massage intensity settings, a plurality of selectable chair position settings, a plurality of selectable chair heat settings, and any combination thereof.

7. The system of claim 1, further comprising a device for providing Internet access.

8. The system of claim 1, further comprising a remote control that is in operative communication with the massage chair.

9. The system of claim 1, further comprising a user selectable multi-languages system for voice response.

10. The system of claim 1, wherein the touchscreen device communicates with the massage chair by sending and receiving digital information via a wire or wireless.

11. The system of claim 1, wherein it further comprises multiple screens, and at least one screen provides health information including body acupressure diagrams, instructions, system status to the user.

12. The system of claim 1, further comprising:
   a touchscreen-based control system comprising a touchscreen device in operative communication with said chair so as to manipulate the movements and performance of said chair.

13. The system of claim 1, wherein the software program allows the user to customize a massage function and save it in a memory and allows user to open or load the saved function.

14. The system of claim 1, wherein the touchscreen device communicates with the massage chair by sending and receiving digital information via a wire or wireless.

15. The system of claim 1, wherein the software program comprises providable information that includes at least an "Auto" mode of massage and a "manual" mode of massage.

16. The system of claim 1, wherein the touchscreen device includes a modes tab configured to permit the user to manually select one or more user preferences or settings which affect the operation of said chair.

17. The system of claim 1, wherein the touchscreen device is configured to permit the user to adjust an intensity of heat and intensity level for a particular bodily location as determined by the user.

18. The system of claim 1, wherein said touchscreen device further comprises a protective surface for providing protection for said touch-sensitive surface.

19. The system of claim 1, wherein the body scanning data may include user's shoulder position or neck position.

20. The system of claim 1, wherein the body scanning data may include user's leg length or foot position or a chair setting position.

21. The system of claim 1, wherein a user's profile may include any user's preferences and setting.

22. The system of claim 1, wherein, the body scanning data may include body size, body shape, body weight, shoulder position, neck position, feet position, upper back and lower back positions, chair position settings, massage intensity settings for each section of body parts, heat therapy settings, massage modes, languages, customize a massage function, or any user's preferences.

23. The system of claim 1, wherein body scanning data may include user's shoulder or neck position detected by the chair.

24. The system of claim 1, wherein body scanning data may include user's foot position or leg length detected by the chair.

25. A touchscreen-based control system for a massage chair, said system comprising:
   a touchscreen device in operative communication with a massage chair that provides massage effects to a body of a user;
   wherein, the touchscreen device communicates with the massage chair by sending and receiving digital information;
   wherein said touchscreen device comprises a housing, touch-sensitive layer, a display layer, a printed circuit board (PCB), a digital processor, a software program that communicates with the touch sensitive layer and the display layer;
   wherein, the software program allows the user to store at least one user's profile that can be recalled at a later time;
   wherein the user's profile includes body scanning data generated through one or more detection sensors located within the massage chair to detect the location of a particular body part of the user, the detection sensor operates based upon pressure applied to the user through a portion of the massage chair; and
   wherein the software activates a body stretching routine when user touches on a screen area.

26. The system of claim 25, wherein the touchscreen device further includes an internet access interface that allows the user to view internet contents including texts, pictures, and videos on the display layer and also allows the user to update the software for the chair.

27. The system of claim 25, wherein the body scanning data may include user's shoulder position or neck position.

28. The system of claim 25, wherein the body scanning data may include user's leg length or foot position or a chair setting position.

29. The system of claim 25, wherein a user's profile may include any user's preferences and setting.

30. The system of claim 25, wherein body scanning data may include body size, body shape, body weight, shoulder position, neck position, feet position, upper back and lower back positions, chair position settings, massage intensity settings for each section of body parts, heat therapy settings, massage modes, languages, customize a massage function, or any user's preferences.

31. The system of claim 25, wherein body scanning data may include user's shoulder or neck position detected by the chair.

32. The system of claim 25, wherein body scanning data may include user's foot position or leg length detected by the chair.

33. A touchscreen-based control system for a massage chair, said system comprising:
a touchscreen device in operative communication with a massage chair that provides massage effects to a body of a user;
wherein, the touchscreen device communicates with the massage chair by sending and receiving digital information;
wherein said touchscreen device comprises a housing, touch-sensitive layer, a display layer, a printed circuit board (PCB), a digital processor, a software program that communicates with the touch sensitive layer and the display layer;
wherein, the software program allows the user to store at least one user's profile that can be recalled at a later time;
wherein the user's profile includes body scanning data generated through one or more detection sensors located within the massage chair to detect the location of a particular body part of the user through non-imaging methods, the one or more detection sensors operate based upon pressure applied to the user through a portion of the massage chair;
wherein the said massage chair further comprises a base, a reclined backrest frame, a footrest, an armrest, and at least a back massage device; and
wherein, the backrest frame has an L shape configuration with a curve near the seat area, and backrest frame further comprises at least a guide rail and a guide channel with gear teeth that provide the track for the back massage device to provide massage effects to a user's body from the shoulder to the thigh areas.

34. The system of claim 33, wherein when the user selects a selection on said touch screen device, a control signal is sent to the chair whereby the massage chair turns on or off a massage feature to provide massage effects to a specific body area of the user at a particular moment or time.

35. The system of claim 33, wherein the touchscreen device is configured to permit the user to adjust an intensity of heat and intensity of massage for a particular bodily location as determined by the user.

36. The system of claim 33, wherein the body scanning data may include user's shoulder position or neck position.

37. The system of claim 33, wherein the body scanning data may include user's leg length or foot position or a chair setting position.

38. The system of claim 33, wherein a user's profile may include any user's preferences and setting.

39. The system of claim 33, wherein body scanning data may include body size, body shape, body weight, shoulder position, neck position, feet position, upper back and lower back positions, chair position settings, massage intensity settings for each section of body parts, heat therapy settings, massage modes, languages, customize a massage function, or any user's preferences.

40. The system of claim 33, wherein body scanning data may include user's shoulder or neck position detected by the chair.

41. The system of claim 33, wherein body scanning data may include user's foot position or leg length detected by the chair.

* * * * *